(12) United States Patent
Wang et al.

(10) Patent No.: US 12,270,482 B2
(45) Date of Patent: Apr. 8, 2025

(54) VALVE

(71) Applicant: DALIAN CONSERVATION SCIENCE & TECHNOLOGY CO., LTD., Liaoning (CN)

(72) Inventors: Jiaxian Wang, Liaoning (CN); Nianlei Liu, Liaoning (CN); Yi Yang, Liaoning (CN)

(73) Assignee: DALIAN CONSERVATION SCIENCE &TECHNOLOGY CO., LTD., Liaoning (CN)

( * ) Notice: Subject to any disclaimer, the term of this patent is extended or adjusted under 35 U.S.C. 154(b) by 0 days.

(21) Appl. No.: 18/550,682

(22) PCT Filed: May 1, 2021

(86) PCT No.: PCT/CN2021/091795
§ 371 (c)(1),
(2) Date: Sep. 15, 2023

(87) PCT Pub. No.: WO2022/193417
PCT Pub. Date: Sep. 22, 2022

(65) Prior Publication Data
US 2024/0159319 A1    May 16, 2024

(30) Foreign Application Priority Data

Mar. 18, 2021   (CN) .......................... 202110317221.1
Mar. 18, 2021   (CN) .......................... 202120600840.7

(51) Int. Cl.
*F16K 3/02*     (2006.01)
*F16K 3/20*     (2006.01)
(Continued)

(52) U.S. Cl.
CPC .............. *F16K 3/0227* (2013.01); *F16K 3/02* (2013.01); *F16K 3/20* (2013.01); *F16K 3/30* (2013.01);
(Continued)

(58) Field of Classification Search
CPC . F16K 3/0227; F16K 3/02; F16K 3/20; F16K 3/30; F16K 3/312; F16K 27/044; F16K 27/105; F16K 41/02
(Continued)

(56) References Cited

U.S. PATENT DOCUMENTS 4,191,216 A * 3/1980 Connolly .................. F16K 3/20
                                                137/315.27
10,539,240 B2 * 1/2020 Shimoda ................. F16K 3/314

FOREIGN PATENT DOCUMENTS

CN      201348053 Y     11/2009
CN      203453505 U     2/2014
(Continued)

*Primary Examiner* — John Bastianelli
(74) *Attorney, Agent, or Firm* — Proi Intellectual Property US

(57) ABSTRACT

A valve includes a valve body, a valve plate, and an actuation mechanism, wherein the valve body includes two plates parallel to each other and symmetrical and on which medium access holes are correspondingly opened; sealing rings a are symmetrically provided on inner surfaces of the two plates, and the medium access holes on the two plates are completely located within circumferentially closed holes of the sealing rings a; the valve plate has a smooth surface and is tightly sandwiched between the sealing rings a when the valve is closed; a fastening structure is installed on the two plates of the valve body and clamps the two plates and/or the sealing rings a around radial peripheries of the sealing rings a; and at least a part of the fastening structure
(Continued)

can adjust its clamping degree in a direction perpendicular to a surface of the valve body.

13 Claims, 24 Drawing Sheets

(51) Int. Cl.
    *F16K 3/30* (2006.01)
    *F16K 3/312* (2006.01)
    *F16K 27/04* (2006.01)
    *F16K 27/10* (2006.01)
    *F16K 41/02* (2006.01)

(52) U.S. Cl.
    CPC ............ *F16K 3/312* (2013.01); *F16K 27/044* (2013.01); *F16K 27/105* (2013.01); *F16K 41/02* (2013.01)

(58) Field of Classification Search
    USPC .......................................................... 251/356
    See application file for complete search history.

(56) References Cited

FOREIGN PATENT DOCUMENTS

| | | |
|---|---|---|
| CN | 204592362 U | 8/2015 |
| CN | 205155194 U | 4/2016 |
| CN | 104455480 A | 9/2016 |
| CN | 112361001 A | 2/2021 |
| JP | 2003205997 A | 7/2003 |
| JP | 2005133899 A | 5/2005 |

* cited by examiner (Detailed Drawing of d1)

(Detailed Drawing of d2)

F-F

VALVE

TECHNICAL FIELD

The present invention relates to a valve.

BACKGROUND ART

Valve is a control component in a fluid delivery system, and has functions such as cut-off, adjustment, flow diversion, reverse flow prevention, pressure stabilization, shunt or overflow pressure relief. There are many varieties and specifications of valves.

The sealing performance of valve refers to the ability of each sealing part of the valve to prevent the leakage of medium, and is the most important technical performance index of the valve. In some occasions, internal leakage is not allowed. Outleakage will cause material loss, pollute environment, even cause accident in severe cases. For flammable, explosive, toxic, harmful or radioactive media, outleakage is not allowed, so the valve must have reliable sealing performance.

In order to obtain excellent sealing performance, diligent studies are conducted, but the result is not satisfactory.

The valves used in many occasions, such as the inlet and outlet of smoke machines used in oil refineries, some desulfurization systems and sulfur recovery systems, are in accordance with the national requirements for environmental protection: the leakage is zero or complies the VI-class sealing of US standard. Another example is that gas or carbonization furnaces have strict requirements on oxygen content, and internal leakage is not allowed. Yet another example is that in some occasions, internal leakage and/or outleakage are not allowed due to the needs of maintenance and safety. In these occasions, the size of valve is often large, and the caliber of valve even reaches more than 6 meters, and thus, it is very difficult to achieve zero leakage. In high-temperature occasions, it is more difficult to realize zero leakage. For example: the inlet valve of the high-temperature smoke machine is used in the flue gas occasion with a design temperature of more than 700 degrees and with a diameter of 1850, and the process requires zero leakage. Both imported and domestically produced valves are expensive, and even so, after a period of use, due to the erosion and wear by the medium, there is a problem of leaking due to poor sealing.

There are many factors affecting the valve sealing problem, including processing and manufacturing precision, deformation caused by transportation and installation, deformation caused by medium temperature and pressure during use, dust or impurities on the valve seat during use which affect the sealing, the impact of particles in the medium on the sealing surface such as erosion and wear, and the yield deformation of the valve seat and the high temperature creep of the valve seat, etc. when the valve with thermal insulation lining and annular valve seat in the valve body is used in high-temperature occasions. All of such factors undoubtedly affect the effective sealing of the valve.

In the catalytic systems of some domestic refineries, the flue gas temperature is more than 680 degrees. In order to achieve zero leakage, the method of water-sealed tanks is used to achieve sealing. However, its disadvantages are undoubtedly quite obvious, including high construction investment, high use and maintenance costs, large pressure loss, high energy consumption, poor reliability and environmental pollution.

In order to achieve zero emission, a double-layer structure butterfly valve or a positive pressure ventilation measure in which a blower is disposed between two gate valves is also used to achieve zero leakage; but the structure is complex, the cost is high, and the size of the valve used in such occasions is often relatively large, and thus, the influence of deformation caused by factors such as temperature and medium pressure during the process of manufacturing, transportation, installation, and use is particularly prominent. Therefore, it must be very difficult to achieve zero leakage. When adopting blower ventilation to form an air curtain to realize sealing, the required air volume is very large and the blower consumes electricity for a long time, leading to a very large energy consumption. In addition, according to the requirements of national standards or ministry standards, when using sealing air to achieve sealing, the sealing air needs to be heated above 100° C., and the heat sealing air may be blown away at any time, further increasing energy consumption, and the heat sealing air may form in the pipeline a large amount of water, which will corrode equipment and pipes after reacting with harmful media, and form agglomeration, scaling and crystallization after mixing with dust, and thus will seriously affect the sealing and switching of the valve, especially when dust accumulates at the bottom of the valve body. However, in some occasions, such as where the oxygen content is required, the measure of sealing air is not allowed. In addition, due to the existence of the valve seat with reduced diameter, the pressure loss is increased.

In the occasions of many solid materials, a large number of gate valves are used. The gap between the valve plate and the valve seat and the sealing part where the valve plate enters and exits are difficult to be sealed tightly, and there are problems of internal leakage and outleakage of the material, bringing lots of trouble.

For this reason, solutions have been sought after, such as Chinese patents "explosion-proof electric open gate valve, authorized announcement number CN204592362U", "two-way sealed knife gate valve, authorized announcement number CN203453505U", etc. Although all of the solutions obtain certain sealing effect, obviously, none of the aforementioned various drawbacks eliminates. In addition, in a case where there is no valve cover, when a pressing mechanism is pressed, interference tends to occur.

In fact, many domestic and foreign gate valves are similar to the above structure, and the aforementioned technical problems and drawbacks are common.

At the same time, attempts have also been made to use glasses valves to solve the above problems, such as a single-plate glasses valve (open type) manufactured by ZMIMERMANN&JANSEN Company of Germany and SchuF Company of the United States and domestic Tianjin Tanggu Jinbin Valve Co., Ltd., wherein N pressing mechanisms are required, and an expansion joint is required for pressing, and that leads to complex structure, high cost, and affects the reliability of use. During the switching process of the single-plate glasses valve, a large amount of media leaks, some are flammable and explosive, some are poisonous and harmful, and are very dangerous. The leaked media pollute the air, which requires a series of measures, such as fire prevention and explosion prevention measures, evacuation measures for construction workers in emergency situations, etc. The double-plate glasses valve (closed type) manufactured by them can better solve some problems in the disassembly process of the traditional blind plate. The double-plate glasses valve is based on the single-plate glasses valve, and two similar sealed cavities are symmetrically fixed on both sides of the axis outside the valve body, and the inside of each cavity is a dead zone, which is easy to accumulate dust. When used for such as a sulfur-containing flue gas medium, the internal cold and hot walls are prone to condensation. The water formed by the condensation will react with the flue gas to form a corrosive medium that will corrode the equipment, and meanwhile, the formed water will agglomerate, scale and crystallize with the dust in the flue gas, seriously affecting the switching and sealing of the valve. When used in high-temperature occasions, the two sealed cavities need to be made of high-alloy steel or need thermal insulation linings, and the pressing mechanism and shaft seal, etc. must be made of high-alloy steel, which further increases the cost.

SchuF Company of the United States also manufactured a double-plate glasses valve with an open type and a closed type combined. On the basis of the aforementioned double-plate glasses valve, a guide rail is fixed above the valve, and the sealed cavities on both sides are hung on the guide rail, and the sealed cavities on both sides can be separated from the valve body. The advantage of this structure is that there is less medium leakage during the switching process, no internal leakage occurs after the sealed cavities are opened, and outleakage can also be checked. Its shortcoming is that in addition to the above-mentioned problem of glasses valve, after the sealed cavities are opened, they occupy a particularly large space, which is equivalent to the width of 4 to 5 valve bodies, and the sealing surfaces and guide rails of the two sealed cavities and valve bodies are also added. When the valve is closed, in order to prevent internal leakage, the sealed cavities on both sides must be opened, and thus, the media in the sealed cavities will escape into the atmosphere. If the media are toxic or flammable, there will be safety hazards and pollution, and more troublesome measures need to be taken. After the sealed cavities are opened, debris may enter the cavities, the insides of the cavities may freeze, or the sealing surface due to the sealing of the two sealing cavities and the sealing surface with the valve body may freeze, which may damage the soft seal between the two and affect the reliability of use. At the same time, it is necessary to seal the actuation mechanism of the opening and closing of the cavities, and thus, the structure is complex, the cost of manufacturing, transportation, installation and maintenance will increase accordingly, and the reliability of its use will inevitably decrease accordingly.

The above two kinds of glasses valves will leak media during the switching process, and they cannot be used as flow regulating valves. Other valves cannot be used as partition devices.

At the same time, after the above-mentioned valve is equipped with a pressing mechanism, measures to prevent mis-operation between the pressing mechanism and the valve plate switch are required when the valve is switched on and off, which will increase some parts and increase the cost and affect the reliability of use.

Undoubtedly, the sealing problem of valves has always been a technical problem in this field, especially for large-sized and high-temperature valves. There is an urgent need for a valve with neither internal leakage (as a partition device or a blind plate) nor outlet leakage, and the problem has been perplexing this field.

SUMMARY OF INVENTION

Aiming at the strict requirements for valve sealing performance in actual production and life and the various problems existing in valve sealing in the prior art, the present invention discloses a valve, which realizes convenient and timely adjustment of the pressing force of each corresponding part of the sealing ring outside the valve and replacement of the sealing ring outside the valve through a simple and reasonable structural design.

Technical solution of the present invention is realized in the following way.

A valve includes a valve body, a valve plate and an actuation mechanism.

The valve body includes two parallel and symmetrical plates, on which medium access holes are correspondingly opened.

Sealing rings a are provided symmetrically on the inner surfaces of the two plates of the valve body, and the medium access holes on the two plates of the valve body are completely located in the circumferentially closed holes of the sealing rings a.

The valve plate is tightly sandwiched between the sealing rings a when the valve is closed.

A fastening structure is installed on the two plates of the valve body and clamps the two plates of the valve body and/or the sealing rings a around the radial peripheries of the sealing rings a. At least a part of the fastening structure can adjust its clamping degree in a direction perpendicular to the surface of the valve body.

Specifically, the valve is a gate valve.

The valve plate has two strip-shaped structures extending from both sides of an end t1 in the direction opposite to the opening direction of the valve plate, the thickness of the structures is the thickness of the valve plate, and the outer edges of the structures are on the extension lines of the outer edges of the valve plate.

In the fully open state of the valve, the position of the end t1 of the valve plate corresponds to the position of the inner edge of the sealing ring a here, the length of the strip-shaped structure is such that the end in the direction opposite to the opening direction of the valve plate does not fall within the valve body, and meanwhile, the width of the strip-shaped structure makes the structure completely press the sealing ring a at the corresponding position; that is, for example, the strip-shaped structure just completely enters the valve body or only the end thereof is exposed from the valve body, and meanwhile, the position of the inner edge of the strip-shaped structure corresponds to the position of the inner edge of the sealing ring a here.

The sealing rings a respectively arranged on the two plates of the valve body are connected as a whole at the end T1 where the strip-shaped structure enters and exits the valve body and tiled to the edge of the end T1 of the valve body, or a sealing material a is laid in the cavity of the valve body between the edge of the end T1 of the valve body and the sealing rings a, wherein the sealing material a and the material of the sealing rings a can be the same, and the sealing rings a or the sealing material a corresponding to the position of the end T1 of the valve body is provided with the inlet and outlet B, B' of the strip-shaped structure.

In order to ensure the sealing of the valve body, the fastening structure includes a screw connection structure and/or a valve body external connection structure.

The screw connection structure includes a through-type screw nut structure, or also includes a top screw a.

The through-type screw nut structure is perpendicular to the two plate surfaces of the valve body and penetrates the two plates to be evenly installed on the outer periphery of the sealing ring a except for the position where the valve plate enters and exits the port of the valve body.

The top screw a is evenly and symmetrically arranged on a channel steel a, the channel steels a are buckled in pairs on the outer surfaces of the two plates of the valve body corresponding to the port where the valve plate enters and exits the valve body, and the top screw a presses the corresponding plate of the valve body inwardly from the outer side of the bottom plate of the channel steel a. Both ends of the channel steel a protrude out of the valve body, and through-type screw nuts are installed at both ends of each pair of the channel steels a. Apparently, the arrangement of the channel steel and the top screw thereon more effectively ensures and improves the sealing effect of the corresponding sealing ring position where the valve plate enters and exits the valve body.

The valve body external connection structure includes lugs and a through-type connector a.

The lugs are fixedly connected to the pipe outer walls of the two pipe nipples on both sides of the valve body and arranged symmetrically with respect to the two plates of the valve body, and the two pipe nipples are respectively fixedly connected in the medium access holes of the two plates of the valve body and have a caliber corresponding to the caliber of the on-site pipeline, that is, the caliber of the pipe nipple is the same as or similar to the caliber of the on-site pipeline. Two or more of the lugs on each pipe nipple are evenly arranged around the pipe wall of the pipe nipple, the bottom plates of the lugs exceed the side edge of the valve body, and the through-type connector a connects and clamps the two lugs arranged symmetrically on both sides of the valve body in a direction parallel to the axis of the pipe nipple.

The through-type connector a is a screw nut structure or section steel or steel pipe; the screw nut structure includes a screw penetrating the two symmetrical lug bottom plates and nuts respectively screwed inward from the outer side of the lug bottom plates, or also includes nuts located inside the lug bottom plates; the section steel or steel pipe penetrates the two symmetrical lug bottom plates to form a fixed connection. When the through-type connector a is a screw nut structure, the adjustable clamping effect of the two plates of the valve body, the valve plate and the sealing ring therein can be realized only through the valve body external connection structure.

Alternatively, the valve includes a pipe nipple and a positioning structure.

Two pipe nipples are respectively fixedly connected in the medium access holes of the two plates of the valve body and inserted into the plates of the valve body; the two pipe nipples have a caliber corresponding to the caliber of the on-site pipeline; the radial inner edge of the sealing ring a is attached to the outer wall of the pipe nipple.

The positioning structure is located outside the sealing ring a in the radial direction of the sealing ring a and fixed on the inner surface of the plate of the valve body and has no contact with the valve plate; the positioning structure has a positioning surface P1, and the positioning surface P1 abuts against the radial outer edge of the sealing ring a; or the positioning structure also has a fixing surface P2 which is connected to the positioning surface P1 at a right angle or an obtuse angle and lies on the inner surface of the plate of the valve body corresponding to the sealing ring a and is connected to the plate of the valve body.

The fastening structure includes the screw connection structure and/or the valve body external connection structure.

The screw connection structure includes top screws b, or also includes the through-type screw nut structure.

The top screws b are evenly arranged corresponding to the sealing ring a, are screwed into the valve body vertically from the outer surface of the plate of the valve body, and push the backing plate to tighten the sealing ring a and the valve plate, and the backing plate is arranged between the inner surface of the plate of the valve body and the sealing ring a corresponding to the sealing ring a; and the through-type screw nut structure is evenly and symmetrically installed outside the radial outer edge of the sealing ring a, connecting the plate of the valve body and the surface P2 of the positioning structure.

The valve body external connection structure includes the lugs and the through-type connector a.

The lugs (refer to the third part of the container support: ear support JB/T-4712.3-2007) are fixedly connected to the pipe outer walls of the two pipe nipples on both sides of the valve body and arranged symmetrically with respect to the two plates of the valve body, and two or more of the lugs on each pipe nipple are evenly arranged around the pipe wall of the pipe nipple, the bottom plates of the lugs exceed the side edge of the valve body, and the through-type connector a connects and clamps the two lugs arranged symmetrically on both sides of the valve body in a direction parallel to the axis of the pipe nipple.

The through-type connector a is a screw nut structure or section steel or steel pipe; the screw nut structure includes a screw that penetrates the two symmetrical lug bottom plates and nuts that are respectively tightened inward from the outer side of the lug bottom plates, or also includes nuts located inside the lug bottom plates; the section steel or steel pipe penetrates the two symmetrical lug bottom plates to form a fixed connection.

Further, ribs a are arranged downstream of the valve plate and close to the position of the valve plate in the pipe nipple, the ribs a are usually in the shape of a long strip, and a plurality of ribs are arranged perpendicular to the surface of the valve plate and parallel to each other. At least one end of each of the ribs a is fixed to the inner wall of the pipe nipple. The arrangement of the ribs a is intended to serve as a strengthening structure for reducing the thickness of the valve plate to reduce costs while improving and ensuring the ability of the valve plate to withstand medium pressure.

Usually in the case of no expansion difference, both ends of the rib a are fixed on the inner wall of the pipe nipple.

When used on a pipeline having a thermal insulation layer or having both a thermal insulation and wear-resistant lining and a thermal insulation layer, the thermal insulation layer or thermal insulation and wear-resistant lining is also set accordingly in the valve body and pipe nipple. In this case, to overcome or avoid the clash problem caused by the large expansion difference between the ribs a and the valve body and pipe nipple, each of the ribs a is configured to have a fixed end and a non-fixed end, that is, one end of the rib a is fixed in the pipe nipple, the other end is not in contact with the inner wall of the pipe nipple and there is a distance $\Delta s$, and $\Delta s$ is not less than the expansion difference between the rib a and the pipe nipple.

Further, in order to ensure the stiffness of the rib a in this case, corresponding to the position of the non-fixed end of the rib a, a limiting structure a is provided on the inner wall of the pipe nipple adjacent to the non-fixed end, and the limiting structure a restricts the displacement of the non-fixed end of the rib a from one or both sides of the non-fixed end. Specifically, the limiting structure a may be a lug with a bottom plate, in terms of medium flow direction, the bottom plate of the lug is fixed near the downstream of the rib a, and the two ear plates on the lug are located on the two sides of the non-fixed end of the rib a, that is, the rib a is sandwiched between the two ear plates on the lug, and the two ear plates are parallel to the rib a.

Further, in order to avoid excessive displacement of the sealing ring a, corresponding to the sealing ring a, a limiting structure b is provided adjacent to the sealing ring a on the inner surfaces of the two plates of the valve body to limit or prevent the displacement of the sealing ring a relative to the plate of the valve body; the limiting structure b has no contact with the valve plate, so as to ensure the sealing effect between the sealing ring a and the valve plate.

Specifically, the limiting structure b is a groove; the sealing ring a is embedded in the groove and is higher than the groove, thereby avoiding the contact between the valve plate and the groove, ensuring that the sealing ring a is attached to the valve plate to achieve the sealing effect.

Or, specifically, the limiting structure b includes an inner baffle (ring) and/or an outer baffle (ring); in the radial direction of the sealing ring a, the inner baffle (ring) is fixed to the inner side of the sealing ring a, and the outer baffle (ring) is fixed to the outer side of the sealing ring a. Similarly, in order to ensure that the sealing ring a is attached to the valve plate to obtain a sealing effect, the height of the inner baffle (ring) is lower than the sealing ring a; meanwhile, the design of the outer baffle (ring) aims to further improve the ability of the sealing ring a to withstand medium pressure, to prevent the displacement of the sealing ring a and the resulting poor sealing. Correspondingly, the height of the outer baffle (ring) is usually lower than the sealing ring a; on the other hand, when the height of the outer baffle (ring) can also be designed to be higher than the sealing ring a according to specific requirements, the outer edge size of the valve plate should be smaller than the inner edge size of the outer baffle (ring), that is, the outer baffle (ring) here is not only used to limit the displacement of the sealing ring a, but also used to limit the running track of the valve plate. Considering the convenience of replacement and maintenance of the sealing ring, and in order to avoid problems caused by welding deformation, the outer baffle (ring) can generally adopt angle steel, and utilize fasteners such as screw nuts, etc. to screw the surface of the angle steel, which functions as the outer baffle (ring) and is attached to the plate of the valve body, to the plate of the valve body; and when the height of the angle steel is higher than the sealing ring a, the angle steel is equivalent to the guide rail of the valve plate while limiting the displacement of the sealing ring a, killing two birds with one stone.

Since the inner baffle and the outer baffle generally surround the inner side and the outer side of the sealing ring a respectively in the radial direction of the sealing ring a, they can also be referred to as an inner stop ring and an outer stop ring in this case. The inner baffle and the outer baffle can be divided into several sections to surround the inner side and outer side of the sealing ring a.

Specifically, considering the difference in expansion coefficient between the sealing ring a and the inner/outer baffle (ring) in a high-temperature environment, to avoid damage to the sealing ring caused by thermal expansion of the inner/outer baffle (ring), there is a radial gap between the inner baffle (ring) and outer baffle (ring) and the sealing ring a not less than the expansion difference between the two.

In order to reduce the influence of the stiffness of the inner/outer baffle (ring) on the adjustment of the pressing force of the sealing ring, the inner baffle (ring) and/or outer baffle (ring) are placed on the surfaces where they face the sealing ring a, and a fracture or cut is provided in a direction substantially perpendicular to the plate of the valve body.

Usually, in order to evenly stress the sealing ring, and in consideration of the convenience of replacing the sealing ring or adjusting its pressing force, the sealing ring a is configured to be in a shape of a square or a rectangle, which is applicable to circular pipes, square pipes and pipes of other shapes.

In order to reduce the friction when the valve plate enters and exits and improve the sealing performance, the sealing ring a is usually made of packing, polytetrafluoroethylene plate, or a composite plate that connects polytetrafluoroethylene plate and rubber plate; the packing includes graphite packing, ceramic packing, etc.; in specific occasions, graphite packing containing carbon fiber, graphite packing with dynamic compensation function, etc. can be used.

Moreover, the sealing ring a can be used with two or more sealing rings fit together. And in order to compensate for the wear of the sealing ring at any time, a spring is installed between the fastening structure on the valve body for pressing and sealing, including the screw nut and top screw, etc., and the valve body.

In order to prevent or reduce damage to the sealing material or sealing ring at the end T1 of the valve body and ensure the sealing effect, preferably, the position of the end t1 of the valve plate is high in the middle and low on both sides in the thickness direction and is in the shape of a sharp knife or cone.

In order to ensure the movement trajectory of the valve plate, guide rails are used to reduce valve plate switches, and the actuation mechanism includes an actuator, a fixed frame, sprockets, chains and a long shaft. The fixed frame is connected to the valve body, and the four sprockets are respectively fixed to the four corners of the fixed frame, and two of the sprockets are respectively fixed to the long shaft, the long shaft is connected to the output end of the actuator, and the two chains are respectively connected to the valve plate through a connector b.

The actuation mechanism can be electric, pneumatic or hydraulic.

In order to eliminate the influence of the surface scaling of the valve plate on valve closure and sealing performance, preferably, a scraper is arranged on the inner side of the two plates of the valve body corresponding to the end position where the valve plate enters and exits the valve body; and when the valve plate enters and exits the valve body, the scraper is in contact with the surface of the valve plate.

In some occasions, after the valve is closed, condensation, scaling or crystallization will inevitably occur on the cold and hot walls of the valve plate. In order to avoid this phenomenon, an electric heater is fixed in the pipe nipple to extend into the valve body to heat the valve body.

Further, in order to prevent the dust on the outer surface of the electric heater from affecting its heating performance, in terms of the flow direction of the medium, a shield is provided inside the pipe nipple corresponding to a position adjacent to the upstream of the heater.

Alternatively, the valve plate is a composite valve plate with a thermal insulation interlayer, that is, the valve plate is a composite structure formed by interposing a thermal insulation layer between the inner and outer surfaces.

Further, the sealing material a or sealing ring a located at the end T1 of the valve body protrudes out of the end T1 of the valve body and a limiting structure c is provided below the sealing material a or sealing ring a, and the limiting structure c is respectively fixed on the inner walls of the two plates of the valve body; the limiting structure c can be in the form of a pallet.

A channel steel b and a fastening structure thereon are provided corresponding to the position of the end T1 of the valve body, and the channel steel b is buckled on the end T1 of the valve body and its two symmetrical elevations are respectively located on the outer sides of the two plates of the valve body and parallel to the two plates of the valve body.

An inlet and outlet C, C' of the strip-shaped structure are opened on the bottom plate of the channel steel b.

Specifically, in order to fix the channel steel and further clamp the valve body, pulling lugs are provided on the outer surfaces of the two plates of the valve body, and the pulling lugs are parallel and close to the bottom plate of the channel steel b, covered in the groove of the channel steel b and not in contact with the channel steel b.

The fastening structure on the channel steel b includes fasteners and top screws which are installed symmetrically.

Symmetrically along the center line of the inlet and outlet C,C', the bottom plate of the channel steel b and the corresponding pulling lugs thereunder are vertically connected and symmetrically clamped using the fasteners which are installed evenly in pairs. Meanwhile, the top screws penetrate the elevations of the channel steel b in the vertical directions of the two symmetrical elevations of the channel steel b and press against the outer surfaces of the two plates of the valve body respectively in a uniform and symmetrical manner.

Further, the size of the inlet and outlet C, C' is larger than the corresponding end size of the strip-shaped structure.

Stuffing boxes and/or stuffing cases are respectively arranged at positions corresponding to the inlet and outlet C, C'.

The circumferences of the stuffing boxes are fixed on the side walls of the inlet and outlet C, C'.

The stuffing cases are vertically arranged on the surface of the outer side of the bottom plate of the channel steel b, including a casing pipe, a sealing material c, a flange gland and a corresponding fastener.

The casing pipe is sleeved on the strip-shaped structure and a flange a is provided at least at one end far away from the inlet and outlet C, C'; the sealing material c is filled in the casing pipe or wound on the strip-shaped structure and is closely attached to the sealing material a or the sealing ring a protruding out of the end T1 of the valve body; the flange gland is screwed to the flange a at one end of the casing pipe away from the channel steel b through a corresponding fastener.

Or, further, in order to reduce the requirements for manufacturing accuracy, overcome the influence of installation deformation, and avoid problems caused by deformation or expansion difference during use, such as clash, the casing pipe is provided with a flange b at one end near the channel steel b, a sealing ring c is provided between the flange b and the bottom plate of the channel steel b, the flange b is screwed to the channel steel b, the corresponding connecting hole on the flange b is a long hole S, and the long side of the long hole S is parallel to the bottom plate of the channel steel b and perpendicular to the axis of the valve body. Generally speaking, the difference between the long side dimension of the long hole S and the outer diameter of the fastener matched therewith is not less than half of the expansion difference between the valve plate and the plate of the valve body.

Or, in order to further increase the flexibility of movement of the stuffing case, a movable flange and a friction reduction structure are further installed between the sealing ring c and the channel steel b, the friction reduction structure is disposed on the outer surface of the bottom plate of the channel steel b and is sleeved around the outer periphery of the sealing material c, the hole diameter of the friction reduction structure may leave a gap between the sealing material c and the friction reduction structure, the movable flange is located between the friction reduction structure and the sealing ring, and the flange b, the movable flange and the channel steel b are screwed sequentially.

Generally, the same material is used for the sealing material c, the sealing ring c, the sealing material a and the sealing ring a, such as packing, polytetrafluoroethylene plate, or a composite plate that connects polytetrafluoroethylene plate and rubber plate; the packing includes graphite packing, ceramic packing, etc.; in specific occasions, graphite packing containing carbon fiber, graphite packing with dynamic compensation function, etc. can be used.

The friction reduction structure can be one of structures such as graphite packing, oil-impregnated packing, polytetrafluoroethylene plate, or N planar universal balls evenly arranged.

When a stuffing case is arranged, the strip-shaped structure protrudes out of the stuffing case with the valve plate fully open.

Furthermore, in order to avoid or reduce the impact on the sealing performance of the valve due to damage to the corresponding sealing material and/or sealing ring, the strip surfaces of the strip-shaped structure transition in and out of the valve body in a circular arc to avoid sharp edges.

Furthermore, in order to facilitate storage and reduce the space occupied, the strip-shaped structure may be made of a flexible material, for example, graphite packing.

In addition, the gate valve may further include a sealing detection structure for immediate detection in order to immediately find the symptom of problem and take corresponding measures to avoid the phenomena of internal leakage and outleakage, and the sealing detection structure includes a square pipe or square steel, a detection hole and the hole cover thereof.

The square pipe or square steel is sandwiched between the inner side of the bottom plate of the channel steel b and the sealing material a or the sealing ring a protruding out of the end T1 of the valve body, and is closely attached to the two symmetrical elevations of the channel steel b in the lateral direction.

Strip-shaped access holes D, D' are opened on the square pipe or square steel corresponding to the strip-shaped structure and the sealing material c surrounded or wrapped around the strip-shaped structure.

Side detection holes F, F are opened corresponding to the strip-shaped access holes D, D' at both ends of the square pipe or square steel respectively.

At least one detection hole G of the end T1 of the valve body is opened on the square pipe or square steel corresponding to the position between the strip-shaped access holes D, D'.

The advantages of the present invention over the prior art are highlighted as follows.

Compared to conventional glasses valves, the present invention has the following significant advantages.

1. There is almost no medium leakage during the opening and closing process, avoiding the risk, contamination, etc. caused by medium leakage such as gas leakage or oil gas leakage, and meanwhile reducing a series of trouble.
2. There is no pressing mechanism which is a ring between the valve plate and the valve seat, the structure is simple, the cost is reduced, and the reliability of use is improved. Thus, the problems of using many high-alloy steels in high-temperature occasions, complicated structure and high cost are avoided.
3. There are no two sealed cavities of the double-plate glasses valve and no actuator mechanism and guide rail for driving the two sealed cavities, further reducing the cost and further improving the reliability of use. Meanwhile, the risks and hazards of medium leakage in the sealed cavities during the opening and closing process are avoided.
4. Since there are no two sealed cavities of the double-plate glasses valve, dust accumulation and condensation inside the sealed cavities are avoided, thus avoiding the problem that the water formed by the condensation will form a corrosive medium, which will corrode the equipment, after the reaction with the flue gas, meanwhile avoiding the problems of agglomeration, scaling, and crystallization of the formed water and the dust in the medium, which seriously affect the switching and sealing of the valve.
5. When used in high-temperature occasions, the two sealed cavities on the glasses valve need to be made of high-alloy steel or used as thermal insulation lining, which further increases the cost. The gate valve disclosed in the present invention omits the sealed cavities on both sides and has a simple structure which greatly reduces the cost of raw materials, especially when used in high-temperature occasions. Since the sealed cavities on both sides are omitted, a series of trouble, hidden dangers and cost increase due to making the thermal insulation lining in the sealed cavities are avoided in high-temperature occasions. When the present invention is used in high-temperature occasions, the cost reduction is very remarkable.
6. Compared with the double-plate glasses valve manufactured by SchuF Company of the United States, which combines the open type and the closed type, the present invention occupies a particularly small space. Meanwhile, since there is no sealed cavity, it avoids the problems of the possible entry of debris and the possible freezing inside the cavities, or the problem that there are impurities on the sealing surface due to the sealing of the two sealing cavities and the sealing surface with the valve body, which may damage the soft seal between the two after freezing, affecting the reliability of use.
7. Due to the omission of many parts and the simple structure, the cost of manufacturing, transportation, installation and maintenance is correspondingly greatly reduced, and the reliability of use is bound to be greatly improved.
8. Only one valve plate and two strip-shaped structures are used, which saves one valve plate and further reduces the cost.
9. The present invention can be used as a flow regulating valve.

Compared to conventional gate valves and other various valves, the present invention has the following significant advantages.
1. The present invention has no valve seat of gate valve or some other valves, hardly reduces pressure loss, and has remarkable energy-saving benefits.
2. There will be no internal leakage. According to the valve of the present invention, the sealing performance of the valve can be monitored from the outside of the valve body, and the pressing force of the sealing ring can be adjusted externally in time, ensuring the sealing performance of the valve during use. Even when the sealing ring is worn out, the pressing force of each part of the sealing ring can be adjusted externally at any time, and the two plates forming the valve body that press the sealing ring part have small stiffness, high elasticity, and high resilience, or the method of directly using the top screw to press the sealing ring through the backing plate may be used, and thus, the pressing force of each part is easy to adjust, so the sealing performance can be guaranteed all the time, which is not available in various conventional valves. Since the sealing ring or sealing packing can be easily replaced outside the valve, there is no need to disassemble the valve, thereby reducing maintenance costs and avoiding the risk of maintenance personnel entering the pipeline for work without disassembling the valve and all kinds of the resulting troubles and problems brought about thereby, including such as air replacement is required when maintenance personnel enters the pipeline for work, the medium composition in the pipeline needs to be analyzed after the replacement, and someone must monitor the work during the work. The maintenance content of this valve is basically to replace the sealing ring or sealing packing. Since there will be no internal leakage, this valve can be used as a blind valve or a partition device, which is of great significance.
3. Since there is no pressing mechanism and valve cover (sealed cavity) of the gate valve, the present invention also has the 2nd, 4th, 5th, and 7th advantages compared with the glasses valve.
4. According to the gate valve of the present invention, the sealing ring or sealing packing that is in contact with the valve plate and valve body has three sides of sealing surface that are always in contact with the valve plate or the strip plate connected to the valve plate, the stroke of the remaining side in contact with the valve plate is short, and the wear of the sealing ring or sealing packing is very small. The sealing ring is blocked by the two plates that constitute the valve body and will not be washed away, greatly improving the service life of the valve. The sealing ring is blocked by the two plates that make up the valve body and will not be washed away, which greatly improves the service life of the valve. And because the sealing ring or sealing packing is always in contact with the valve plate or the strip plate, there will be no problem affecting the switch due to impurities in the medium, which greatly increases the reliability of use.
5. The stuffing case is movable, which solves the problem of interference of the valve plate after thermal expansion.
6. Compared with the traditional gate valve, the gate valve of the present invention has no valve seat, so there is no hidden danger of dust accumulation and wear at the position of the corresponding valve seat and no resulting problem of lax valve closing and unfavorable sealing. There is no guide rail, and no precise valve plate track is needed, so there is no risk of the valve plate getting stuck on the track. There is no pressing mechanism between the valve plate and the valve seat, which naturally reduces machining operations, lowers overall precision requirements, and makes manufacturing easier. The structural design of the present invention allows it to use a thinner valve plate, which reduces the cost, and meanwhile allows the valve body to be made lighter, which naturally reduces the requirements for the valve support components. Similarly, the valve of the present invention will not cause scaling, agglomeration, or crystallization, which ensures flexible and reliable switching and ensures the sealing performance. In the occasions that require the thermal insulation lining to be cast in the valve body, the expansion difference between the annular valve seat and the valve body in the valve body of conventional valves exceeds 1%, which will cause the valve body and valve plate to yield or cause high temperature creep, thereby affecting the sealing; but the valve of the present invention does not have the above-mentioned annular valve seat, and the valve plate can expand freely, which fundamentally avoids the generation of this problem and solves this technical problem that has plagued the field for a long time.

7. When used for solid materials, there will be no internal leakage or outleakage.

In fact, the gate valve of the present invention is close to a single-plate glasses valve in structure, and avoids the problems of the single-plate glasses valve being unable to switch without stopping or the medium leaking during the switch and the aforementioned series of problems existing in the double-plate glasses valve. It can also be said that the gate valve of the present invention has the function of a double-plate glasses valve with only one valve body; and even after power outages and steam outages lead to failure of heat tracing and thus lead to crystallization and scaling, the valve can still be easily opened and closed; that is to say, under the above extreme conditions, the valve plate will not be stuck.

In a word, the present invention has ingenious design, simple structure, easy manufacture, and more convenient installation, use and maintenance. In particular, the split structure of the valve body ingeniously guarantees good sealing performance, saves energy and reduces consumption, and meanwhile ensures safe and reliable performance even in high-temperature environments. The most important point is: because the leakage can be monitored from the outside at any time and the pressing force of the valve body and sealing ring can be adjusted in time, the valve described in the present invention fully guarantees its safety and reliability including sealing performance during use, and thus, all kinds of technical problems that have long plagued the field of valves caused by unfavorable sealing in the prior art are easily solved. In particular, the two strip-shaped structures also smartly make the overall cost including raw materials, manufacture, installation and use, maintenance and supporting facility construction, etc. effectively controlled, which can save users a lot of money and human beings a lot of energy and reduce the discharge of exhaust gas, waste water, waste residue.

The valve of the present invention can realize two functions. The valve can be used as a gate valve to adjust the flow rate, and meanwhile, the valve can also be used as a blind valve to replace the partition device so as to realize the partition that meets the "human safety" standard and serve multiple purposes, which is not available in all the conventional valves. The valve is particularly suitable for occasions requiring large caliber, high temperature, and zero leakage, especially, the valve solves the sealing problem of large-sized valves, and also solves a series of problems of valves with thermal insulation lining.

In view of this, the gate valve of the present invention can be widely used to replace valves of different specifications including existing gate valves, glasses valves, four-link valves, water-sealed tanks, low-pressure butterfly valves, etc., and is widely used in various environments and occasions including normal temperature, high temperature, and the valve has shown its good performance and wide applicability.

BRIEF DESCRIPTION OF THE DRAWINGS

FIGS. 11 to 14 are schematic diagrams of a limiting structure b of a sealing ring a according to embodiment 5 of the present invention and schematic diagrams of a square sealing ring, wherein FIG. 11 is a schematic diagram in which the limiting structure b of the sealing ring a according to embodiment 5 of the present invention is a groove.

FIG. 12 is a C-C sectional view of FIG. 11,

FIG. 13 is a schematic diagram in which the limiting structure b of the sealing ring a of the gate valve according to embodiment 5 of the present invention is an inner baffle (ring) and an outer baffle (ring), and FIG. 14 is a D-D sectional view of FIG. 13.

FIGS. 16 to 17 are schematic diagrams of a structure, in which a valve plate end t1 is in a shape of a sharp knife or a cone, according to the embodiments of the present invention, wherein FIG. 17 is a F-F sectional view of FIG. 16.

FIGS. 20 to 21 are schematic diagrams of a structure, in which a thermal insulation lining is in the valve body, according to embodiment 6 of the present invention, wherein FIG. 21 is an H-H sectional view of FIG. 20.

FIGS. 23 to 24 are schematic diagrams of a structure, in which the gate valve is equipped with a sealing detection structure, according to the embodiments of the present invention, wherein FIG. 24 is a left view of FIG. 23.

Figure 1:
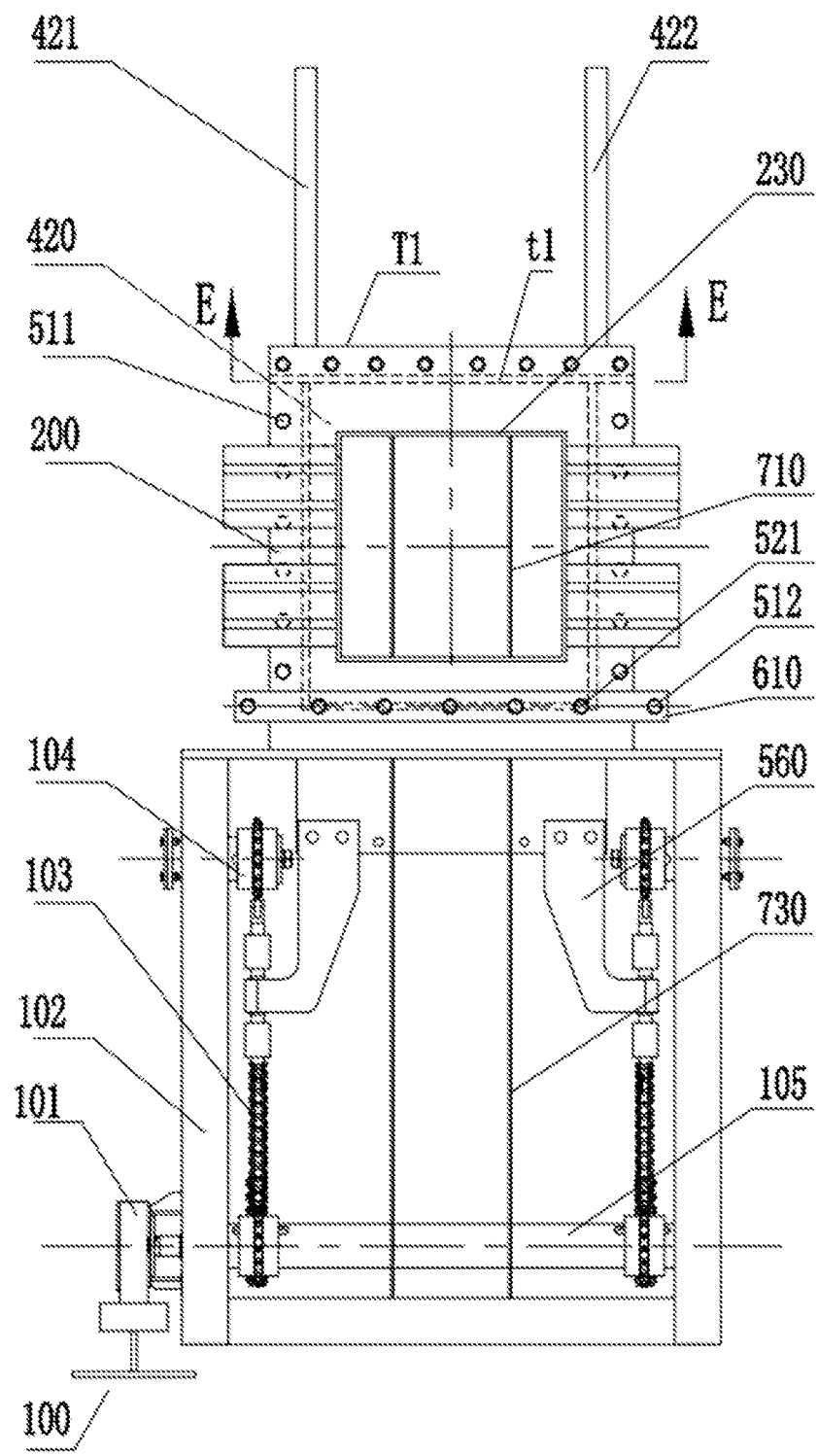
FIG. 1 is a schematic diagram of a structure of a gate valve (I) according to embodiment 1 of the present invention.

REFERENCE SIGNS LIST 100 actuation mechanism
101 electric actuator
102 actuation mechanism fixed frame 103 chain
104 sprocket
105 long shaft
200 valve body
211, 212 plate of valve body
230 pipe nipple
311, 312 sealing ring a
313 sealing material a
314 groove
315 inner baffle (ring)
316 outer baffle (ring)
317 pallet
330 stuffing box
340 stuffing case
341 casing pipe
342 sealing material c
343 flange a
344 flange b
345 flange gland
346 sealing ring c
347 friction reduction structure
348 movable flange
420 valve plate
420a, 420b inner and outer plates of composite valve plate
423 thermal insulation interlayer of composite valve plate
421, 422 strip-shaped structure
511, 512, 513, 514, 515, 516, 517 fastener
521, 522, 522 top screw b
530 valve body external connection structure
531 lug
532 screw nut
533 section steel or steel pipe
540 pulling lug
551 positioning angle steel
552 backing plate
560 connector
610 channel steel a
620 channel steel b
710 rib a
720 limiting lug (a kind of limiting structure a)
721 limiting plate
722 bottom plate
730 rib
810 square pipe or square steel
820 detection hole cover
910 thermal insulation lining or thermal insulation and wear-resistant lining
920 electric heater
921 shield
end t1 of valve plate, end T1 of valve body
A inlet and outlet of valve plate on the sealing ring b
S, S' long hole opened on the flange b
B, B' inlet and outlet of the strip-shaped structure opened on the sealing ring a or the sealing material a corresponding to the position of the end T1 of the valve body
C, C' inlet and outlet of the strip-shaped structure opened on the bottom plate of the channel steel b
D, D' inlet and outlet of the strip-shaped structure opened on the square pipe or square steel
F, F' side detection hole
G detection hole
P1 positioning surface for positioning the angle steel 551
P2 fixing surface for positioning the angle steel 551

DESCRIPTION OF EMBODIMENTS

Embodiment 1

Figure 2:
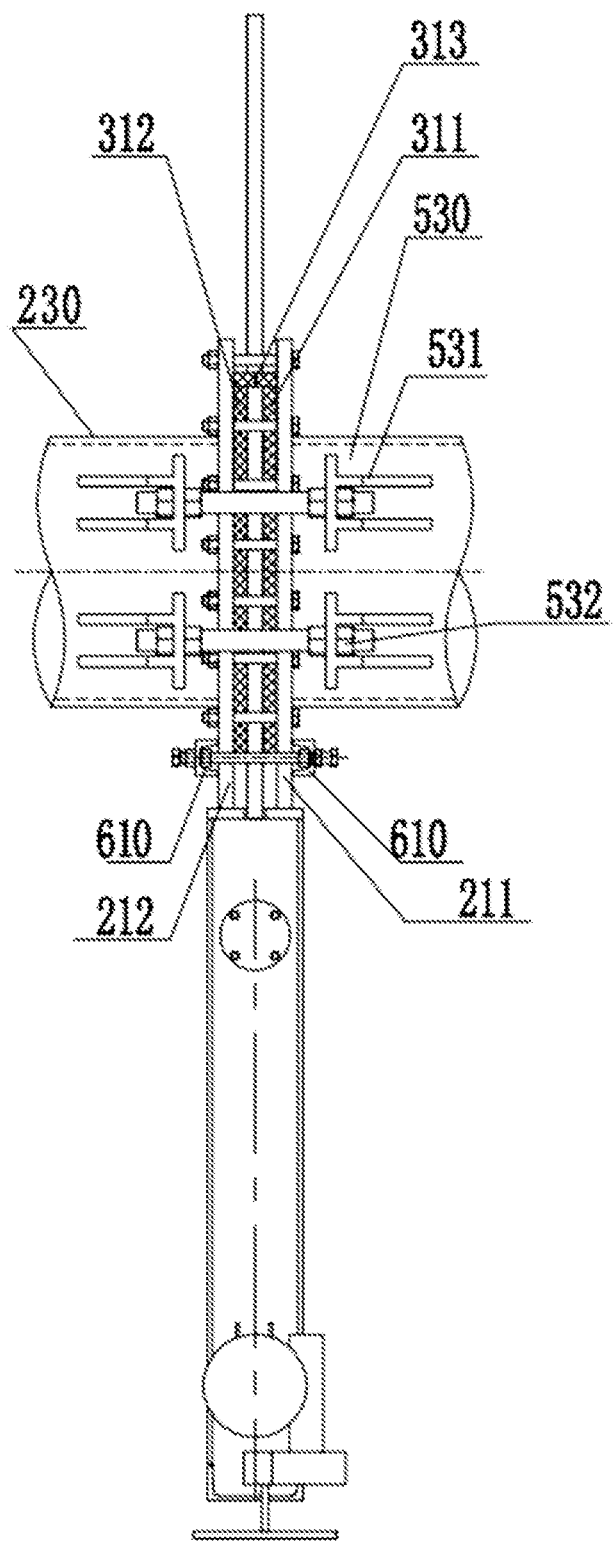
FIG. 2 is a left view of FIG. 1.
Figure 3:
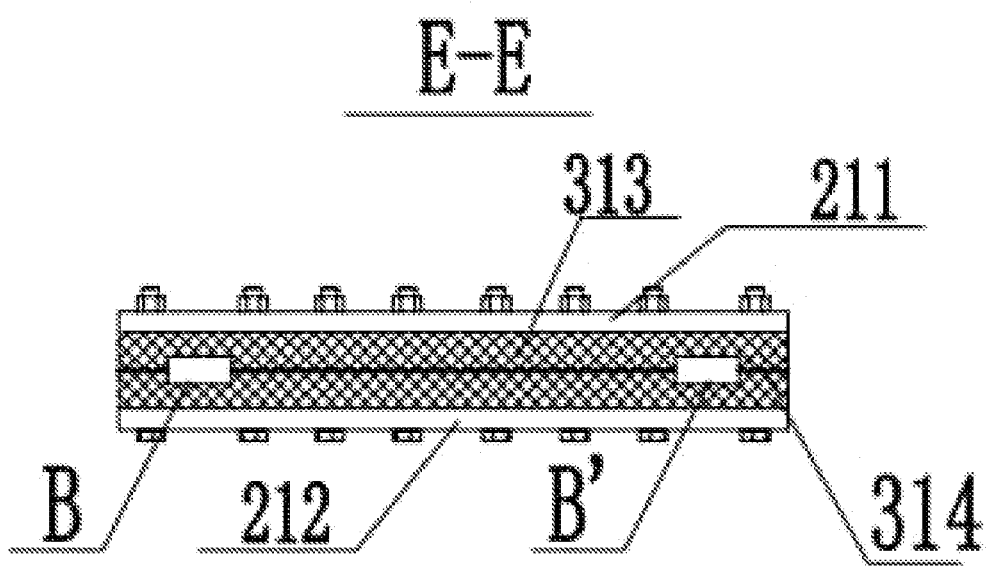
FIG. 3 is an E-E sectional view of FIG. 1.

A gate valve (I), as shown in FIGS. 1-3, includes a valve body 200, a valve plate 420 and an actuation mechanism 100, wherein the valve body 200 includes two parallel and symmetrical square plates 211, 212, the two plates 211, 212 of the valve body are respectively provided with medium access holes having a similar or the same size as the on-site pipeline correspondingly; sealing rings a311, 312 are arranged symmetrically on the inner surfaces of the two plates 211, 212 of the valve body, and the medium access holes on the two plates 211, 212 of the valve body are completely located in the circumferentially closed holes of the sealing rings a311, 312, and the axes of the holes on the sealing rings a311, 312 are coaxial with the axes of the holes on the two plates 211, 212 of the valve body 200.

The valve plate 420 has a smooth surface and is tightly sandwiched between the sealing rings a311, 312 when the valve is closed.

In order to tightly clamp the two plates 211, 212 of the valve body 200 and the sealing rings a311, 312 therein, screw holes are evenly opened on the radial peripheries of the sealing rings a311, 312 on the two plates 211, 212 of the valve body, and screw-on fasteners, such as screw nuts 511, 512 and top screw 521, are used to realize the adjustable clamping effect.

Specifically, the two plates 211, 212 and the sealing rings a311, 312 of the valve body can be tightly clamped by using a through-type fastener 511 on both sides of the valve body 200 in the direction of the valve plate 420 entering and exiting the valve body 200, wherein a screw nut is used as the through-type fastener 511.

A pair of channel steels a610 are buckled on the outer surfaces of the two plates 211, 212 of the valve body corresponding to the port where the valve plate 420 enters and exits the valve body, and the top screw 521 is used to evenly and symmetrically press the corresponding plates 211, 212 of the valve body inwardly from the outer side of the bottom plate of the channel steel a610. Both ends of the channel steel a610 protrude out of the valve body 200 and through-type fasteners 512 are installed at the two ends of each pair of the channel steels a610, wherein a screw nut is used as the through-type fastener 512.

The valve plate 420 of the gate valve (I) has a square shape, as shown in FIG. 1, and two strip-shaped structures 421, 422 extend from both sides of an end t1 of the valve plate 420 in the opposite direction to the opening direction of the valve plate 420, the thickness of the strip-shaped structures 421, 422 is the thickness of the valve plate 420, and the outer edges of the strip-shaped structures 421, 422 are on the extension lines of the outer edges of the valve plate 420.

In the fully open state of the valve, the position of the end t1 of the valve plate 420 corresponds to the position of the inner edge of the sealing rings a311, 312 here, the strip-shaped structures 421, 422 just completely enter the valve body 200 or only the ends thereof are exposed from the valve body 200, and the positions of the inner edges of the strip-shaped structures 421, 422 correspond to the positions of the inner edges of the sealing rings a311, 312 here.

The sealing rings a311, 312 respectively arranged on the two plates 211, 212 of the valve body are connected as a whole at the end T1 where the strip-shaped structures 421, 422 enter and exit the valve body and tiled to the edge of the end T1 of the valve body, or a sealing material a313 is laid in the cavity of the valve body 200 between the edge of the end T1 of the valve body 200 and the sealing rings a311, 312, wherein the sealing material a313 and the material of the sealing rings a311, 312 are the same, and the sealing rings a311, 312 or the sealing material a313 corresponding to the position of the end T1 of the valve body is provided with the inlet and outlet B, B' of the strip-shaped structures 421, 422.

In order to reduce the influence of thermal expansion and contraction of on-site pipelines on the use of the valve and avoid the use of expansion joints, the valve can also be equipped with a valve body external connection structure 530. Relying on the valve body external connection structure 530, the problem of adjusting the clamping (force) of the two plates 211, 212 of the valve body and the valve plate 420 and the sealing rings a311, 312 therein and the problem of the influence of thermal expansion and contraction of the pipeline on the use of the valve can be solved at the same time. The valve body external connection structure 530 generally includes lugs 531 and a through-type connector a.

The lugs 531 are fixedly connected to the outer walls of the two pipe nipples 230 on both sides of the valve body 200 and arranged symmetrically with respect to the two plates 211, 212 of the valve body, and the two pipe nipples 230 are respectively fixedly connected in the medium access holes of the two plates 211, 212 of the valve body 200 and have a caliber corresponding to the caliber of the on-site pipeline, that is, the caliber of the pipe nipple 230 is the same or similar to the caliber of the on-site pipeline. Two or more of the lugs 531 on each pipe nipple 230 are evenly arranged around the pipe wall of the pipe nipple 230, the bottom plates of the lugs 531 exceed the side edge of the valve body 200, and the through-type connector a connects and clamps the two lugs 531 arranged symmetrically on both sides of the valve body 200 in a direction parallel to the axis of the pipe nipple 230.

In order to facilitate the adjustment of the clamping force between the two plates 211, 212 of the valve body 200, the sealing rings a311, 312 and the valve plate 420 sandwiched therein, the through-type connector a can be a screw nut structure 532; the screw nut structure 532 includes a screw penetrating the two symmetrical bottom plates of the lugs 531 and nuts respectively screwed inward from the outer sides of the bottom plates of the lugs 531. Or, in order to adjust the clamping force more conveniently and achieve clamping more effectively, the screw nut structure 532 also includes adjustable nuts located on the inner sides of the bottom plates of the lugs 531. When the screw nut structure 532 is used as the through-type connector a, the above-mentioned fasteners 511, 512, top screw 521, channel steel a610, etc. may not be used, and the screw nut structure 532 can be used for adjustment. This achieves the effect of simplifying the structure.

Figure 15:
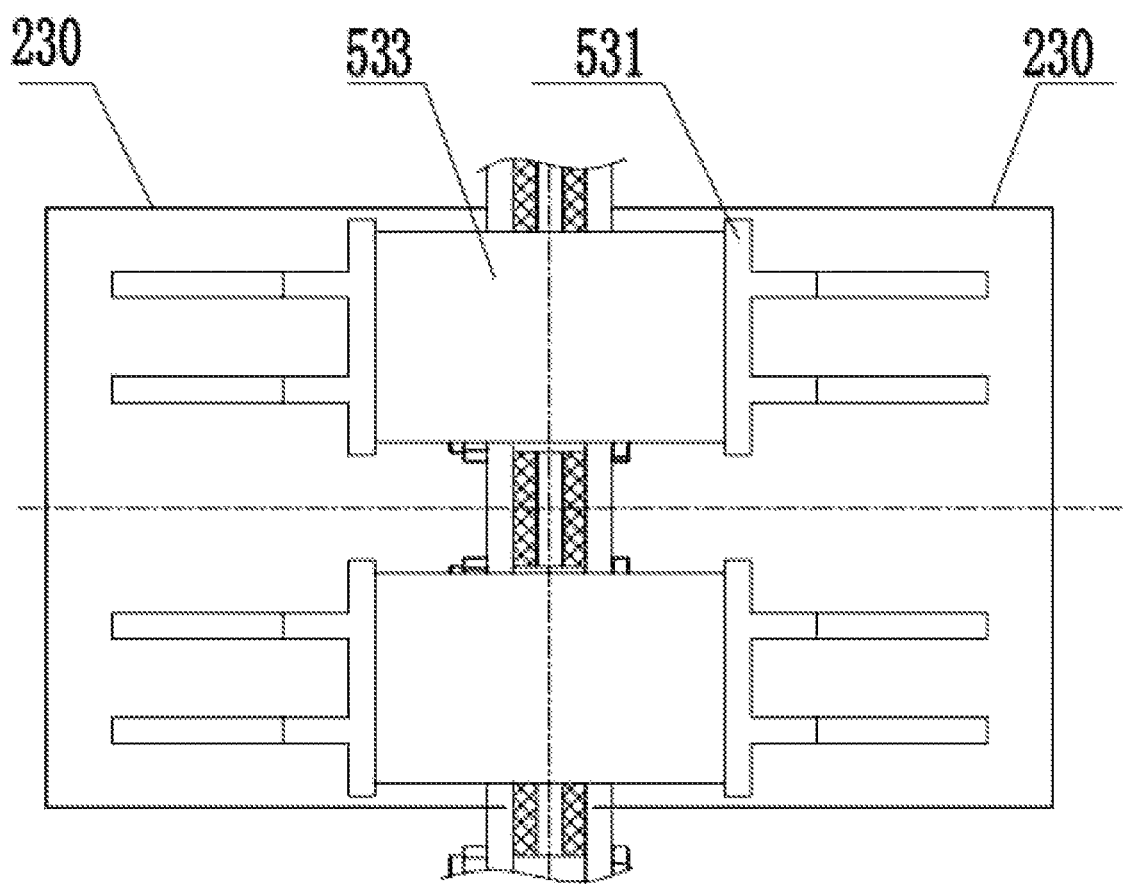
FIG. 15 is a schematic diagram of a structure, in which a through-type connector a of a valve body external connection structure of the valve according to the embodiments of the present invention is a steel pipe or section steel.

In some occasions, in consideration of simplifying the process, improving stiffness, reducing costs, and ensuring sealing performance, the through-type connector a can be a section steel or the steel pipe 533, as shown in FIG. 15.

The actuation mechanism 100 includes an electric actuator 101, an actuation mechanism fixed frame 102, a sprocket 104, a chain 103 and a long shaft 105; the fixed frame 102 is connected to the valve body 200, the long shaft 105 is connected to the output end of the actuator 101, four sprockets 104 are respectively fixed at the four corners in the fixed frame 102, and two of the sprockets 104 are respectively fixed to the long shaft 105, and are connected to the valve plate 420 through the chain and a connector b560.

In addition to adopting the electric actuator 101, the actuation mechanism 100 can also adopt a pneumatic or hydraulic actuator.

Preferably, in order to prevent and reduce damage to the sealing rings a311, 312 or the sealing material a313 at the corresponding position when the valve plate 420 is closed and to better ensure the sealing effect, the inner walls of the sealing rings a311, 312, which have constituted an integral body, corresponding to the position where the strip-shaped structures 421, 422 enter and exit the end T1 of the valve body, or the inner wall of the sealing material a313 here, has an elongated groove in the part facing the side wall of the valve plate 420. The elongated groove may be triangular or square, so that the corresponding shape of the corresponding position of the valve plate 420 matches therewith (not illustrated).

Embodiment 2

Figure 4:
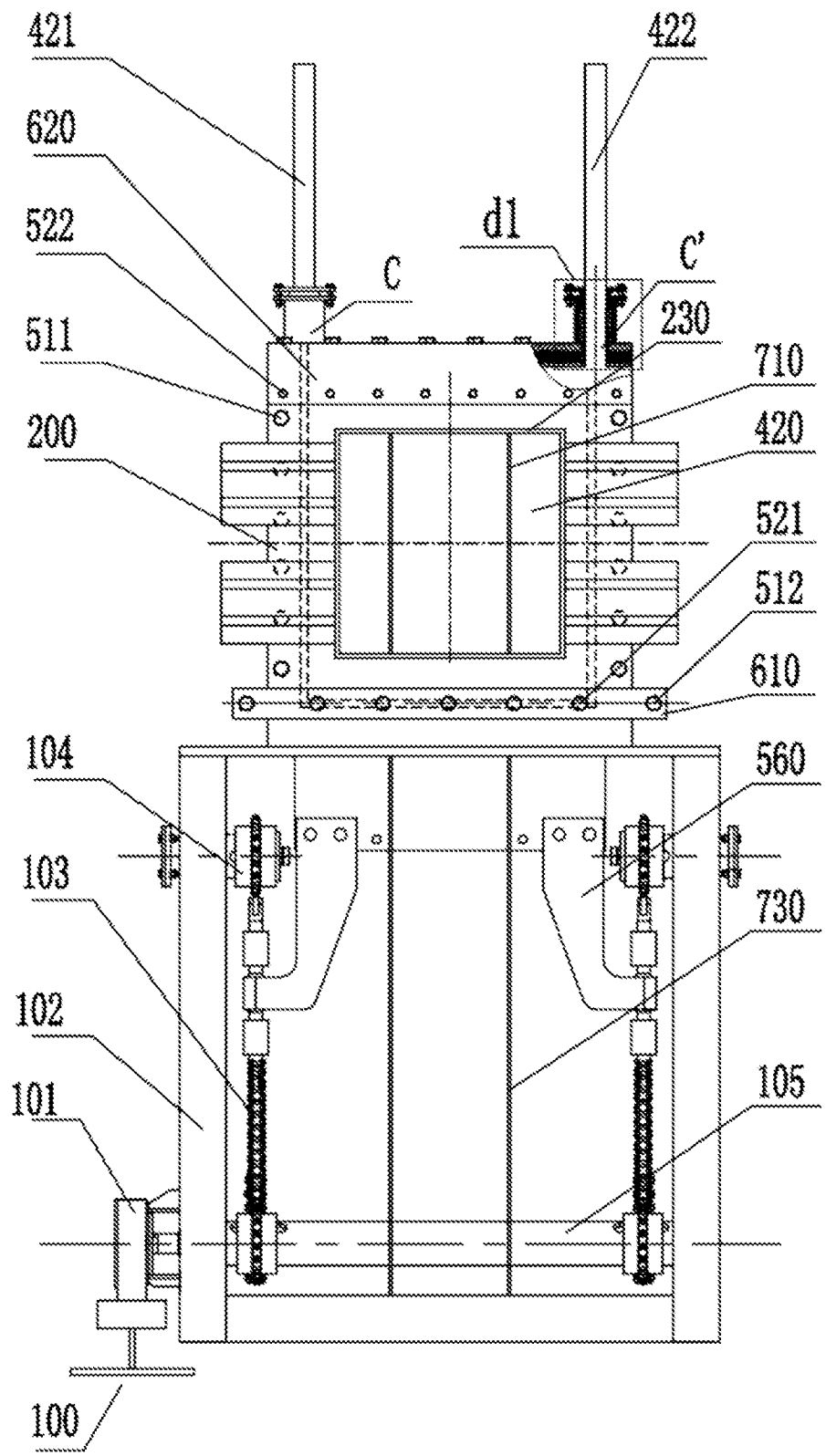
FIG. 4 is a schematic diagram of a structure of a gate valve (II) according to embodiment 2 of the present invention.
Figure 5:
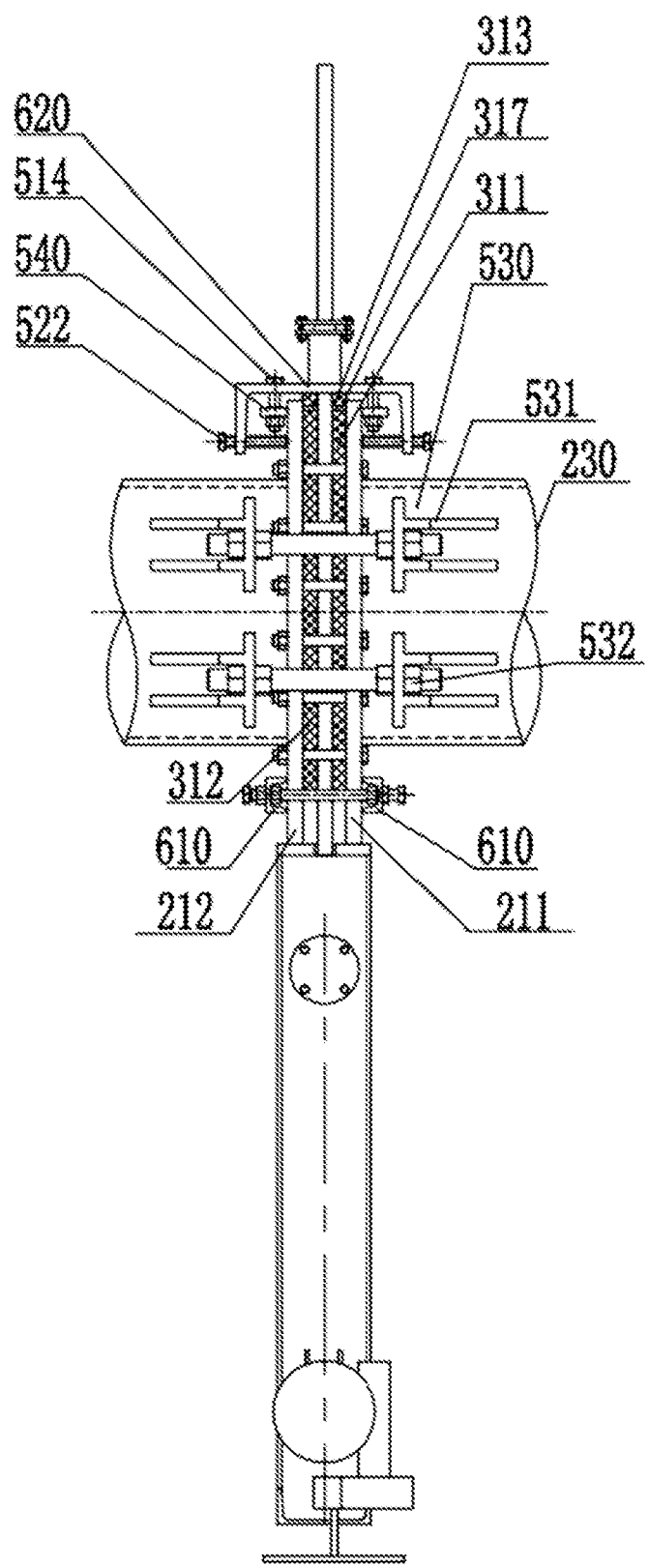
FIG. 5 is a left view of FIG. 4.
Figure 6:
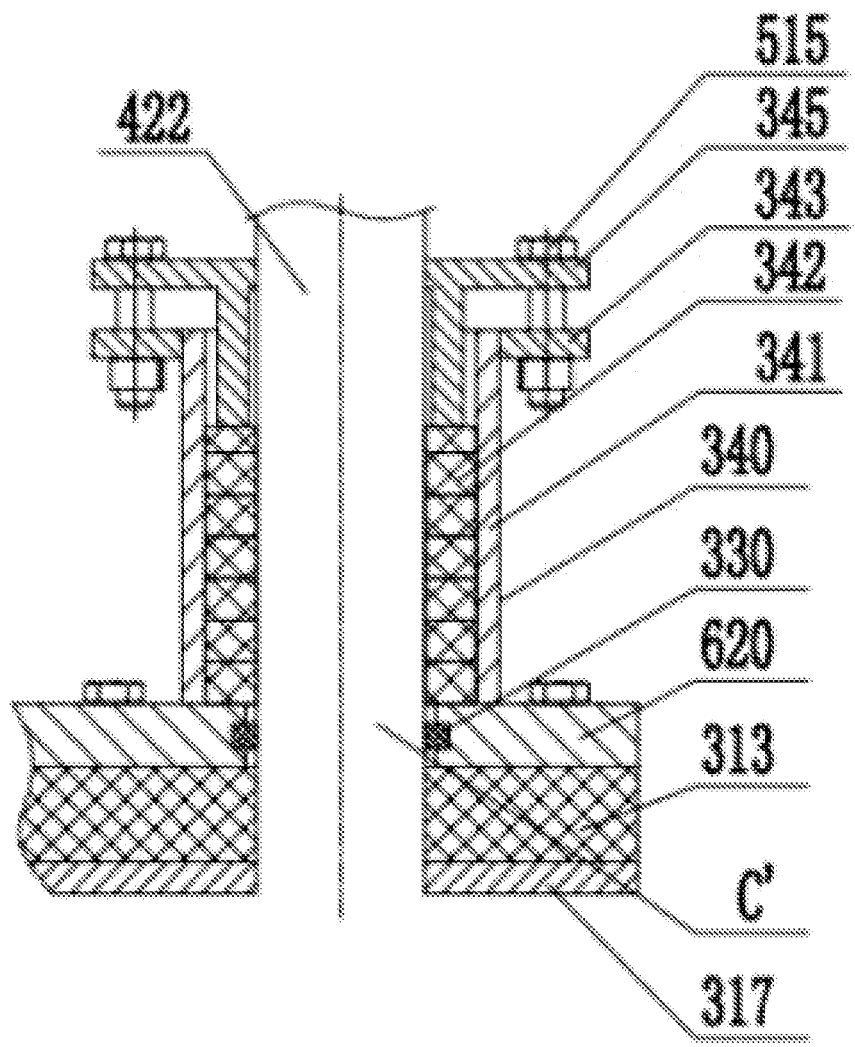
FIG. 6 is a partial enlarged view of d1 in FIG. 4.

A gate valve (II) is as shown in FIGS. 4-6, wherein the sealing material a313 or the sealing rings a311, 312 located at the end T1 of the valve body protrudes out of the end T1 of the valve body 200 and a pallet 317 is provided therebelow as a limiting structure on the basis of the gate valve (I) described in embodiment 1 in order to meet the needs of some occasions, and the pallet 317 is respectively fixed on the inner walls of the two plates 211, 212 of the valve body 200 to ensure the sealing effect of the valve and to prevent large displacement of the sealing rings a311, 312 or the sealing material a313 at the end T1 of the valve body 200 during the opening and closing of the valve.

In order to press the sealing material a313 or the sealing rings a311, 312 protruding out of the end T1 of the valve body 200 to ensure the sealing effect, a channel steel b620 and a corresponding fastening structure are provided corresponding to the position of the end T1 of the valve body 200, and the channel steel b620 is buckled on the end T1 of the valve body and its two symmetrical elevations are respectively located on the outer sides of the two plates 211, 212 of the valve body and parallel to the two plates 211, 212 of the valve body.

The inlet and outlet C, C' of the strip-shaped structures 421, 422 are opened on the bottom plate of the channel steel b620.

In order to facilitate the fixing of the channel steel b620, pulling lugs 540 are provided on the outer surfaces of the two plates 211, 212 of the valve body 200, the pulling lugs 540 are parallel to and close to the bottom plate of the channel steel b620, are covered in the groove of the channel steel b620, are not in contact with the channel steel b620, and are symmetrical with respect to the center line of the inlet and outlet C, C'; the bottom plate of the channel steel b620 and the surface of the pulling lugs 540 parallel to the bottom plate are evenly provided with screw holes correspondingly and clamped by a through-type fastener 514. The through-type fastener 514 can be a screw nut. Meanwhile, screw holes are opened on the two symmetrical elevations of the channel steel b620 symmetrically and evenly, and the top screw 522 penetrates the elevations of the channel steel b620 in the vertical direction of the elevations of the channel steel b620 and presses against the outer surfaces of the two plates 211, 212 of the valve body 200 respectively.

In order to ensure the sealing of the strip-shaped structures 421, 422 at the inlet and outlet C, C' on the channel steel b620, the sizes of the inlet and outlet C, C' are larger than the sizes of the corresponding ends of the strip-shaped structures 421, 422. And a stuffing box 330 or a stuffing case 340 is provided corresponding to the positions of the inlet and outlet C, C' respectively.

The circumference of the stuffing box 330 is fixed on the side walls of the inlet and outlet C, C'.

The stuffing case 340 is vertically arranged on the surface of the outer side of the bottom plate of the channel steel b620, including a casing pipe 341, a sealing material c342, a flange gland 345 and a corresponding fastener 515.

The casing pipe 341 is sleeved on the strip-shaped structures 421, 422 and a flange a343 is provided at least at one end far away from the inlet and outlet C, C'; the sealing material c342 is filled in the casing pipe 341 or wound on the strip-shaped structures 421, 422 and is closely attached to the sealing material a313 or the sealing rings a311, 312 protruding out of the end T1 of the valve body; the flange gland 345 is connected to the flange a343 at one end of the casing pipe 341 away from the channel steel b620 through the through-type fastener 515.

The sealing material c342 is usually made of the same material as the sealing rings a311, 312 or the sealing material a313, which will not be repeated here.

Embodiment 3

Figure 7:
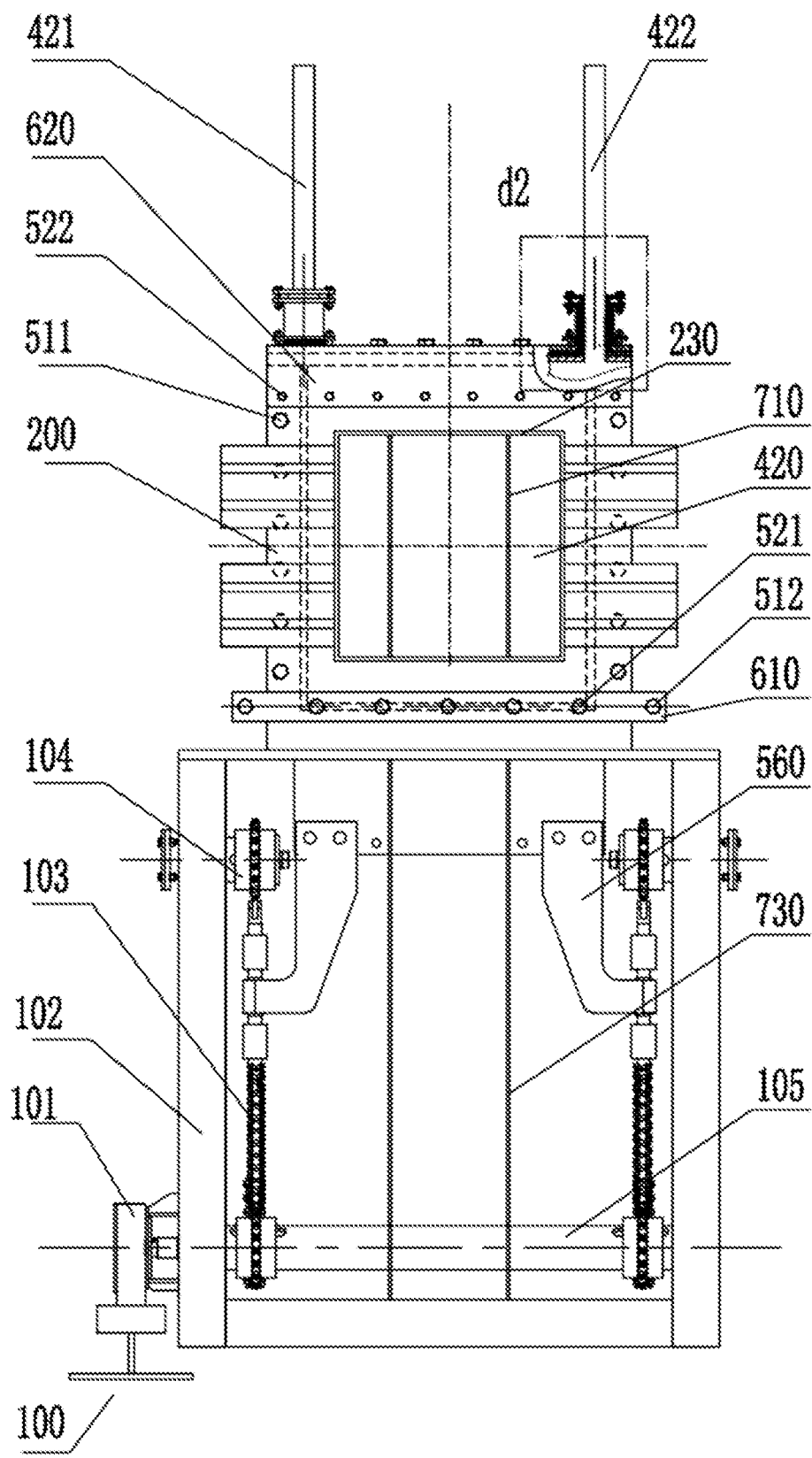
FIG. 7 is a schematic diagram of a structure of a gate valve (III) according to embodiment 3 of the present invention.
Figure 8:
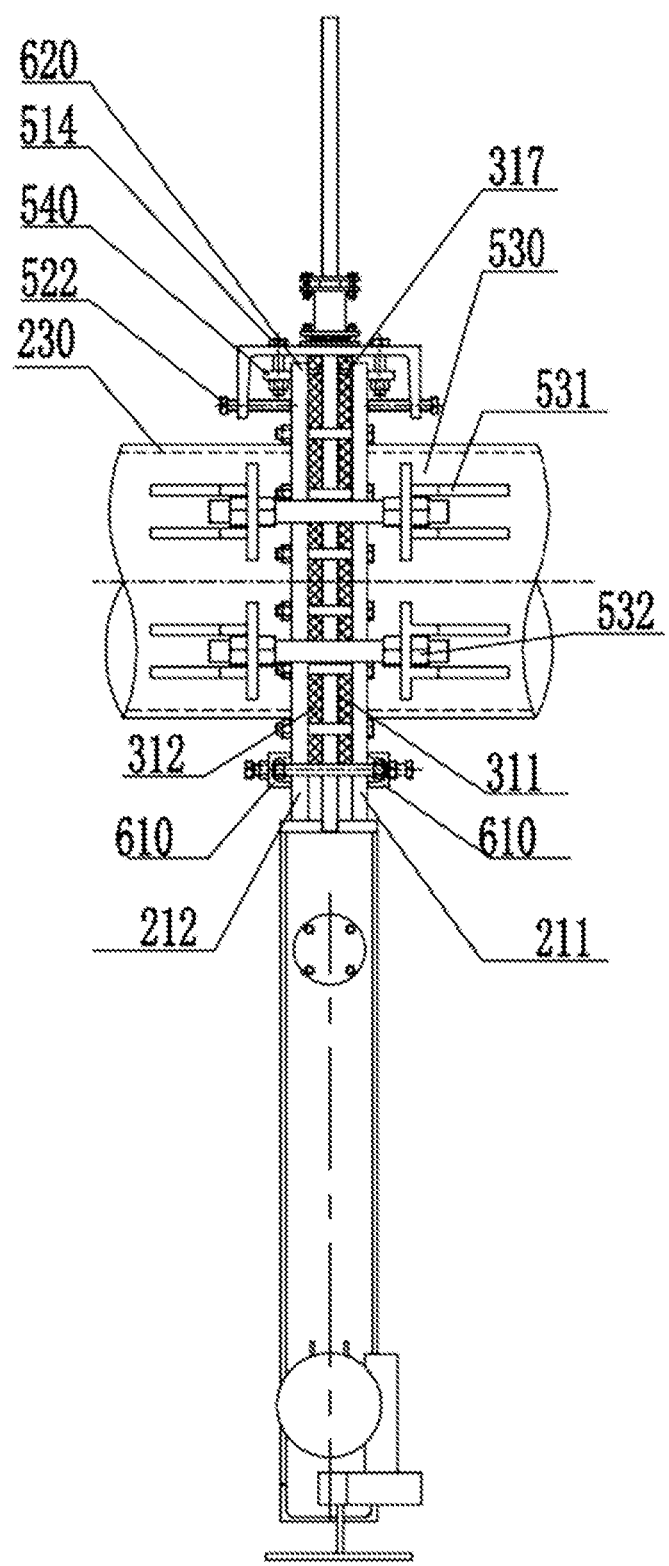
FIG. 8 is a left view of FIG. 7.
Figure 9:
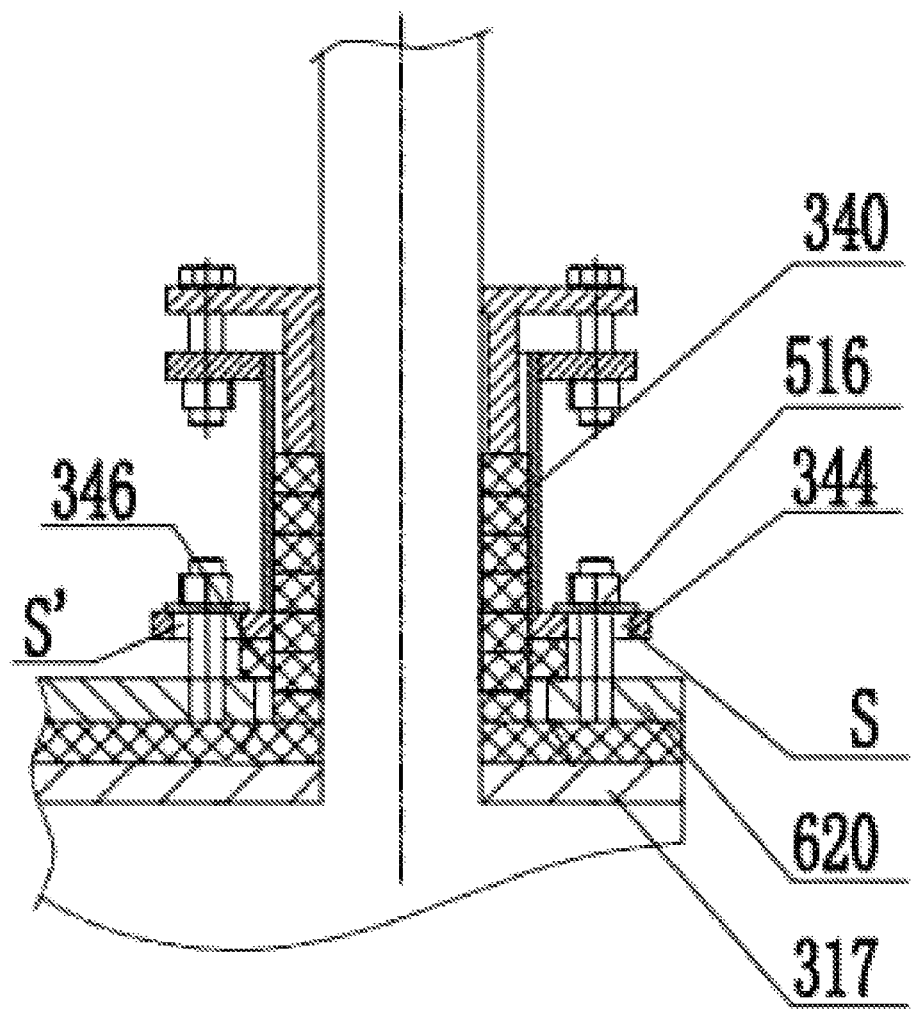
FIG. 9 is a partial enlarged view of d2 in FIG. 7.

A gate valve (III) is as shown in FIGS. 7-9, wherein the following technical features are further increased in consideration of reducing the requirements for manufacturing accuracy, overcoming the influence of installation deformation, and avoiding problems caused by clashes, etc. due to deformation or expansion difference during use on the basis of embodiment 2, including:

For the stuffing case 340, the casing pipe 341 is provided with a flange b344 at one end near the channel steel b620, a sealing ring c346 is provided between the flange b344 and the bottom plate of the channel steel b620, the flange b344 is screwed to the channel steel b620, the corresponding connecting holes on the flange b344 are long holes S, S', and the long sides of the long holes S, S' are parallel to the bottom plate of the channel steel b620 and perpendicular to the axis of the valve body 200. Generally speaking, the difference between the long side dimension of the long holes S, S' and the outer diameter of the screw of the fastener 516 matched therewith is not less than half of the expansion difference between the valve plate 420 and the plates 211, 212 of the valve body.

A sealing ring c346 with lubricating properties is arranged between the flange b344 and the channel steel 620, so that the stuffing case 340 can move perpendicular to the axial direction of the valve body 200, avoiding the problem of interference or clash.

Embodiment 4

Figure 10:
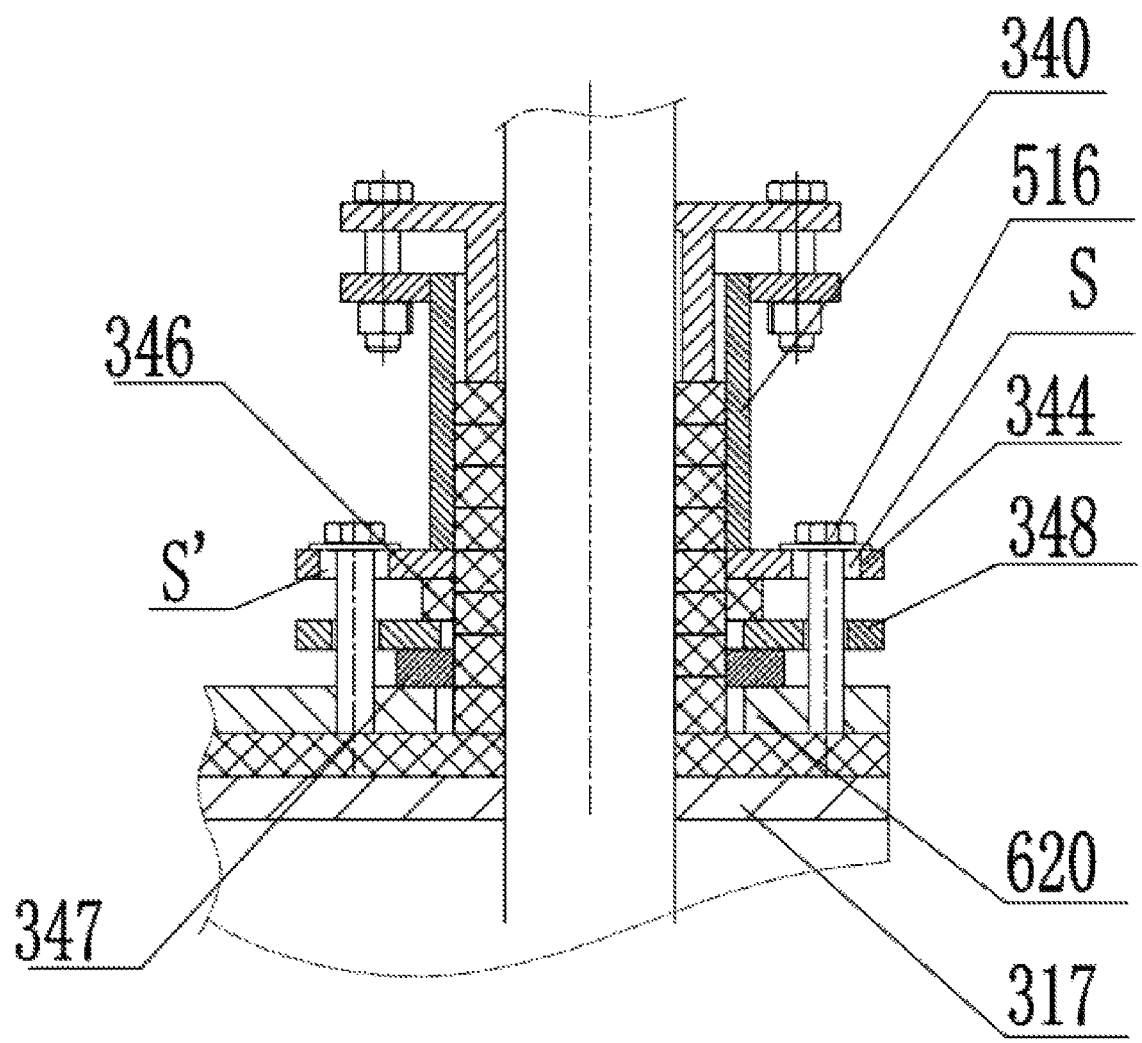
FIG. 10 is a schematic diagram of a structure of a gate valve (IV) according to embodiment 4 of the present invention.

A gate valve (IV) is as shown in FIG. 10, wherein a movable flange 348 and a friction reduction structure 347 are further installed between the sealing ring c346 and the channel steel b620 on the basis of embodiment 3 in order to further increase the flexibility of movement of the stuffing case 340, the friction reduction structure 347 is disposed on the outer surface of the bottom plate of the channel steel b620 and is sleeved around the outer periphery of the sealing material c342, the hole diameter of the friction reduction structure 347 may leave a gap between the sealing material c342 and the friction reduction structure 347, the movable flange 348 is located between the friction reduction structure 347 and the sealing ring c346, and the flange b344, the movable flange 348 and the channel steel b620 are screwed sequentially.

Generally, the same material as the sealing material a313, the sealing ring a312 and the sealing ring b320 is used for the sealing material c342 and the sealing ring c346, such as packing, polytetrafluoroethylene plate, or a composite plate that connects polytetrafluoroethylene plate and rubber plate; the packing includes graphite packing, ceramic packing, etc.; in specific occasions, graphite packing containing carbon fiber, graphite packing with dynamic compensation function, etc. can be used.

The friction reduction structure 347 can be one of structures such as graphite packing, oil-impregnated packing, polytetrafluoroethylene plate, or N planar universal balls evenly arranged.

In order to further reduce friction, a friction reduction structure (not illustrated) can be added between the flange b344 and the fastener 516.

In the above-mentioned valve arranged with the stuffing case 340, when the valve plate 420 is fully open, the strip-shaped structures 421, 422 protrude out of the stuffing case 340.

Furthermore, in the above-mentioned embodiment of the gate valve, the strip surfaces of the strip-shaped structures 421, 422 transition in and out of the valve body in a circular arc in the radial direction of the valve body to avoid sharp edges (not illustrated) in order to avoid or reduce the impact on the sealing performance of the valve due to the wear of the corresponding sealing material and/or sealing ring.

Furthermore, in order to facilitate storage and reduce the space occupied, the strip-shaped structure may be made of a flexible material, for example, graphite packing.

Figure 23:
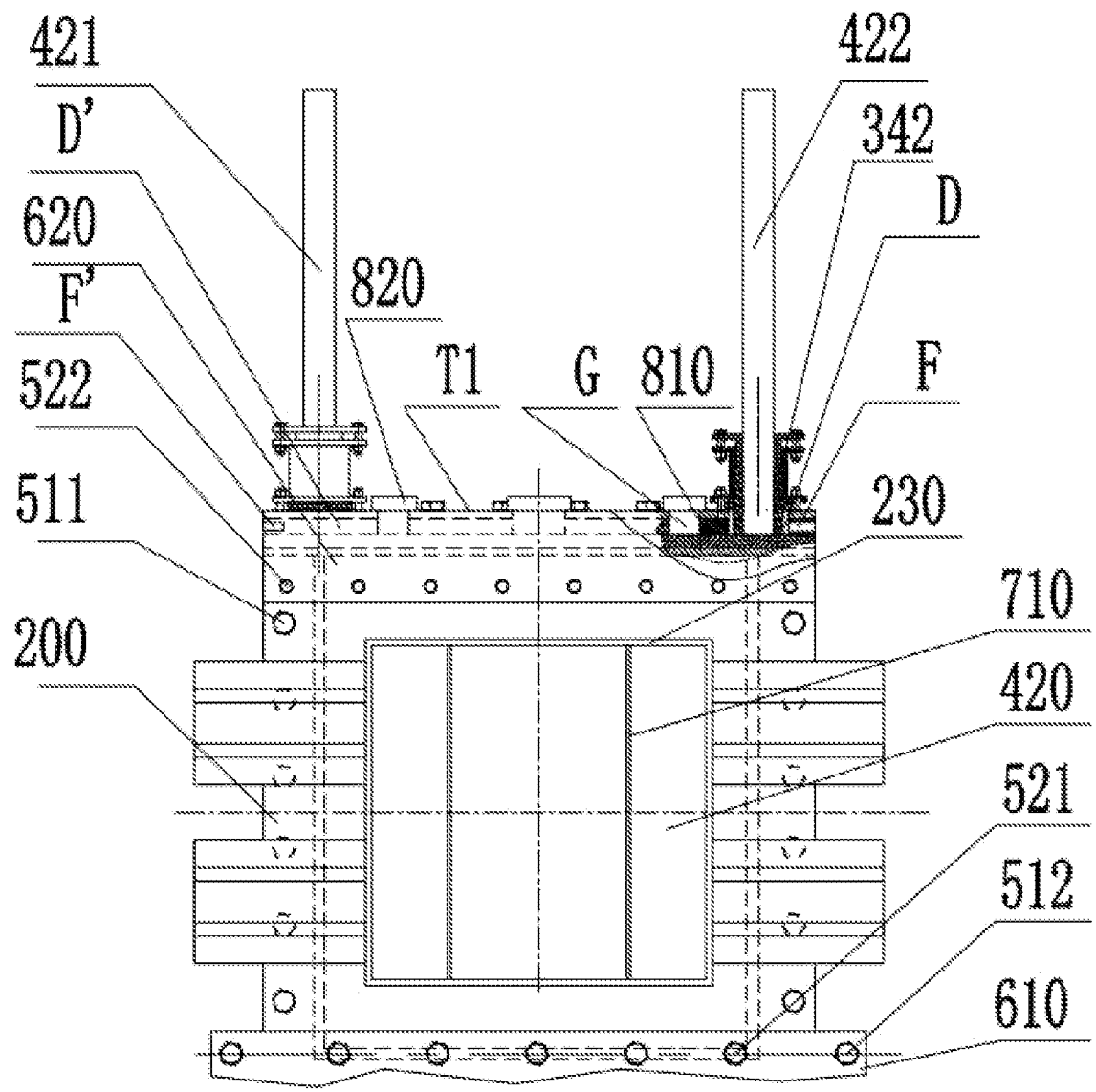
Figure 24:
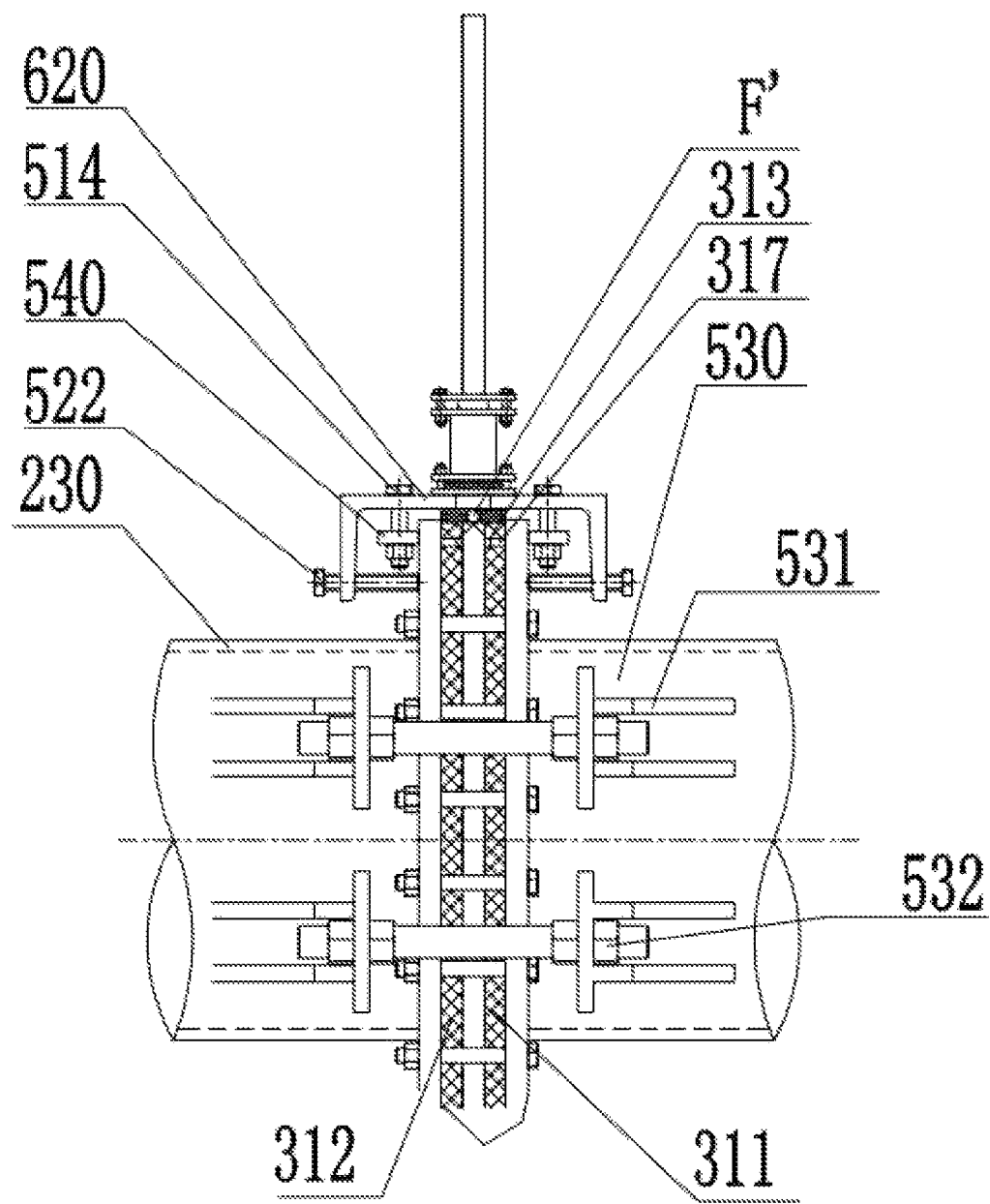

In addition, the gate valve further includes a sealing detection structure for immediate detection in order to immediately find the symptom of problem and take corresponding measures to avoid the phenomena of internal leakage and outleakage, and as shown in FIGS. 23, 24, the sealing detection structure includes a square pipe or a square steel 810, detection holes G, F, F', and a detection hole cover 820.

The square pipe or the square steel 810 is sandwiched between the inner side of the bottom plate of the channel steel b620 and the sealing materials a311, 312 or the sealing ring a313 protruding out of the end T1 of the valve body 200.

Strip-shaped access holes D, D' are opened on the square pipe or the square steel 810 corresponding to the strip-shaped structures 421, 422 and the sealing material c342 surrounded or wrapped around the strip-shaped structures 421, 422.

Side detection holes F, F' are opened corresponding to the strip-shaped access holes D, D' at both ends of the square pipe or the square steel 810 respectively.

At least one detection hole G of the end T1 of the valve body is opened on the square pipe or the square steel 810 corresponding to the position between the strip-shaped access holes D, D'.

Embodiment 5

Figure 11:
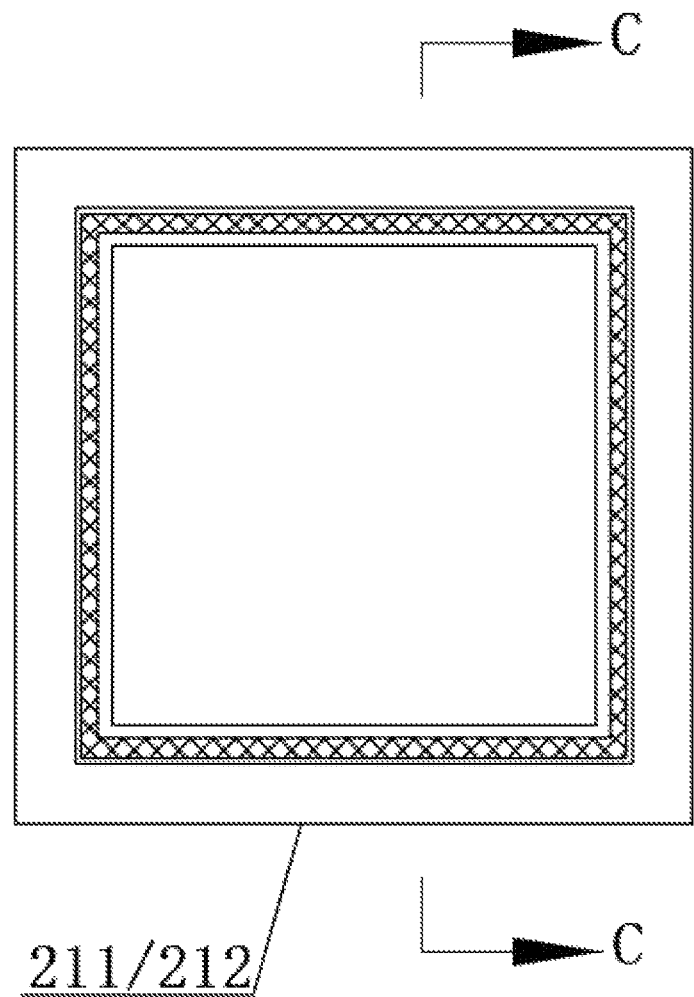
Figure 12:
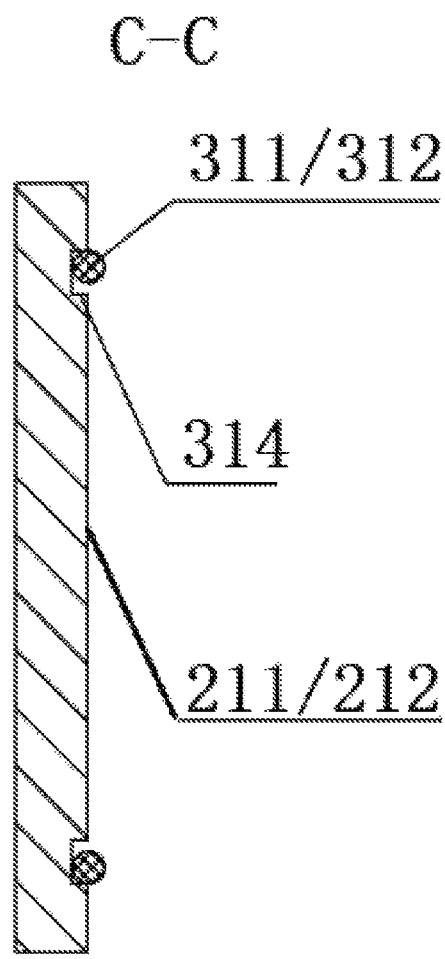

For the valves described in the above-described embodiments 1-4, in order to avoid excessive displacement of the sealing rings a311, 312 which affects the sealing performance of the valve, the limiting structure b is arranged on the inner surfaces of the two plates 211, 212 of the valve body corresponding to the positions of the sealing rings a311, 312, wherein the limiting structure b is a groove 314, and as shown in FIGS. 11, 12, the sealing rings a311, 312 are embedded in the groove 314 and are higher than the groove 314, thereby avoiding the contact between the valve plate 420 and the groove 314, ensuring that the sealing rings a311, 312 are attached to the valve plate 420 to achieve the sealing effect.

Figure 13:
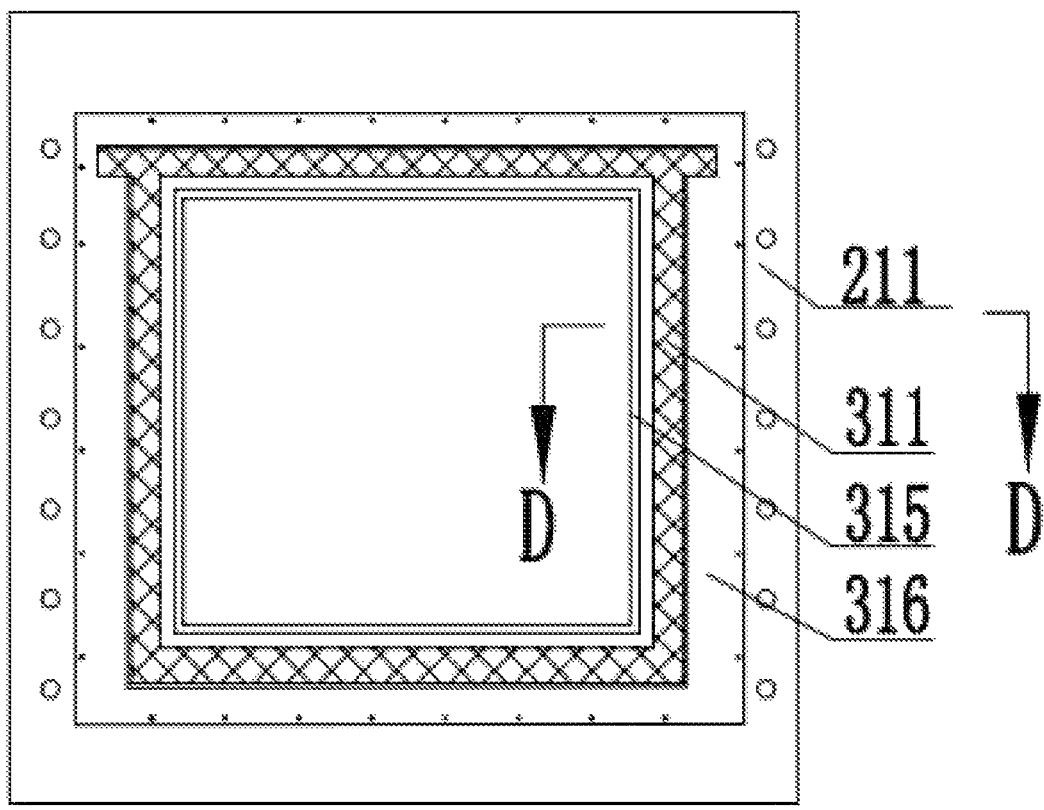
Figure 14:
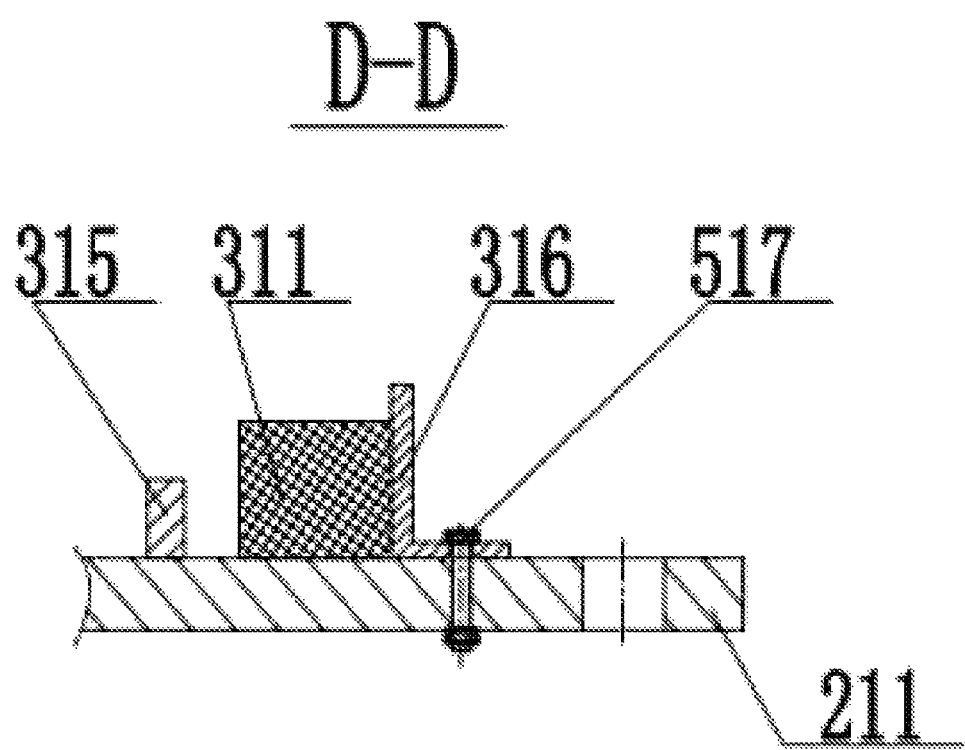

Or, the limiting structure b is an inner baffle (ring) 315 and/or an outer baffle (ring) 316, as shown in FIGS. 13, 14; in the radial direction of the sealing rings a311, 312, the inner baffle (ring) 315 is fixed to the inner sides of the sealing rings a311, 312, and the outer baffle (ring) 316 is fixed to the outer sides of the sealing rings a311, 312. Similarly, in order to ensure that the sealing rings a311, 312 are attached to the valve plate to obtain a sealing effect, the height of the inner baffle (ring) 315 is lower than the sealing rings a311, 312; meanwhile, the design of the outer baffle (ring) 316 aims to further improve the ability of the sealing rings a311, 312 to withstand medium pressure, to prevent the displacement of the sealing rings a311, 312 and the resulting poor sealing. Correspondingly, the height of the outer baffle (ring) 316 is usually lower than the sealing rings a311, 312; on the other hand, the height of the outer baffle (ring) 316 can also be designed to be higher than the sealing rings a311, 312 according to specific requirements, accordingly, the outer edge size of the valve plate 420 should be smaller than the inner edge size of the outer baffle (ring) 316, that is, the outer baffle (ring) 316 here is not only used to limit the displacement of the sealing rings a311, 312, but also used to limit the running track of the valve plate 420. Considering the convenience of replacement and maintenance of the sealing rings a311,312, and in order to avoid problems caused by welding deformation, the outer baffle (ring) 316 can generally adopt angle steel, and utilize the fasteners 517 (such as screw nuts, etc.) to screw the surface of the angle steel, which functions as the outer baffle (ring) 316 and is attached to the plates 211, 212 of the valve body, to the plates 211, 212 of the valve body respectively; and when the height of the angle steel is higher than the sealing rings a311, 312, the angle steel is equivalent to the guide rail of the valve plate 420 while limiting the displacement of the sealing rings a311, 312, that is, the valve plate 420 is always attached to the sealing rings a311, 312, and thus, when the valve plate 420 moves, the valve plate 420 will not exceed the angle steel which functions as the outer baffle (ring) 316 so as to limit the trajectory range of the valve plate 420, as shown in FIG. 14.

Considering the difference in expansion coefficient between the sealing rings a311, 312 and the inner/outer baffles (rings) 315, 316, wherein the thermal expansion and contraction coefficient of the sealing ring is generally smaller and the thermal expansion and contraction coefficient of the metal used as the inner/outer baffles (rings) is generally larger, in a high-temperature environment, in order to prevent the sealing rings a311, 312 from being broken or damaged due to an excessive expansion difference between the sealing rings a311, 312 and the two plates 211, 212 of the valve body as well as the inner/outer baffles (rings) 315, 316 thereon, a gap not smaller than the expansion difference is provided between the inner and outer baffles (rings) 315, 316 and the sealing rings a311, 312 in the radial direction.

In order to reduce the influence of the stiffness of the inner/outer baffles (rings) on the adjustment of the pressing force of the sealing rings a, the inner baffle (ring) 315 and/or the outer baffle (ring) 316 are placed on the surfaces where they face the sealing rings a311,312, and a fracture or cut (not illustrated) is provided in a direction substantially perpendicular to the plates 211, 212 of the valve body.

Figure 18:
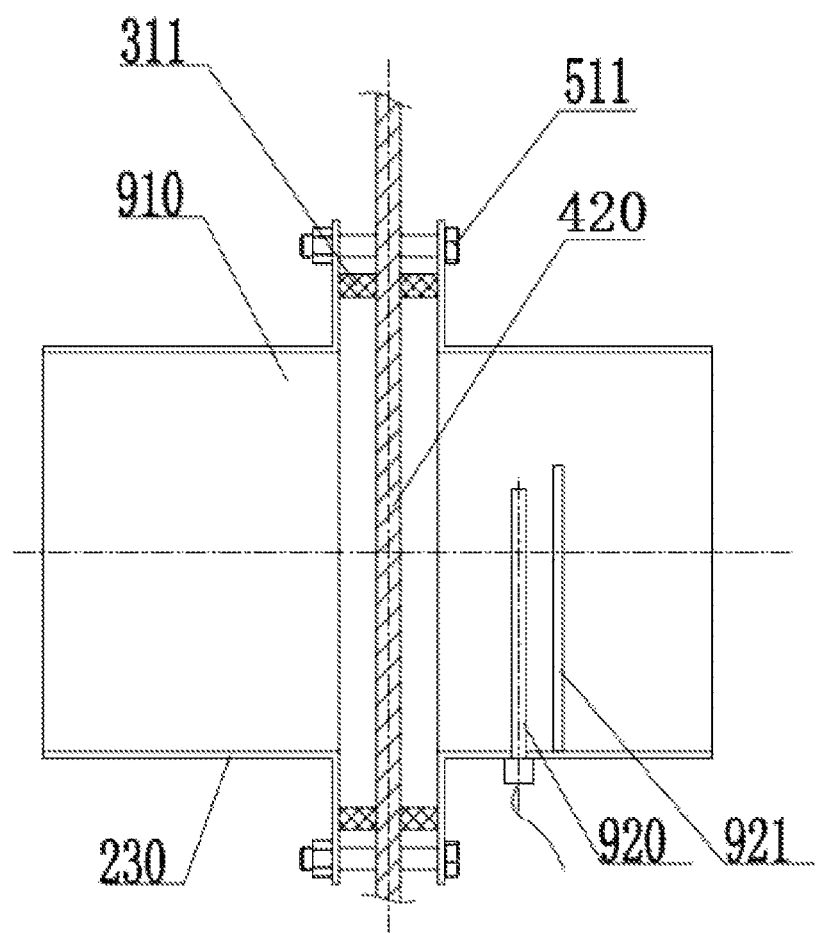
FIG. 18 is a schematic diagram of a structure, in which an electric heater and a shield are inside a pipe nipple connected to the valve body, according to the present invention.
Figure 20:
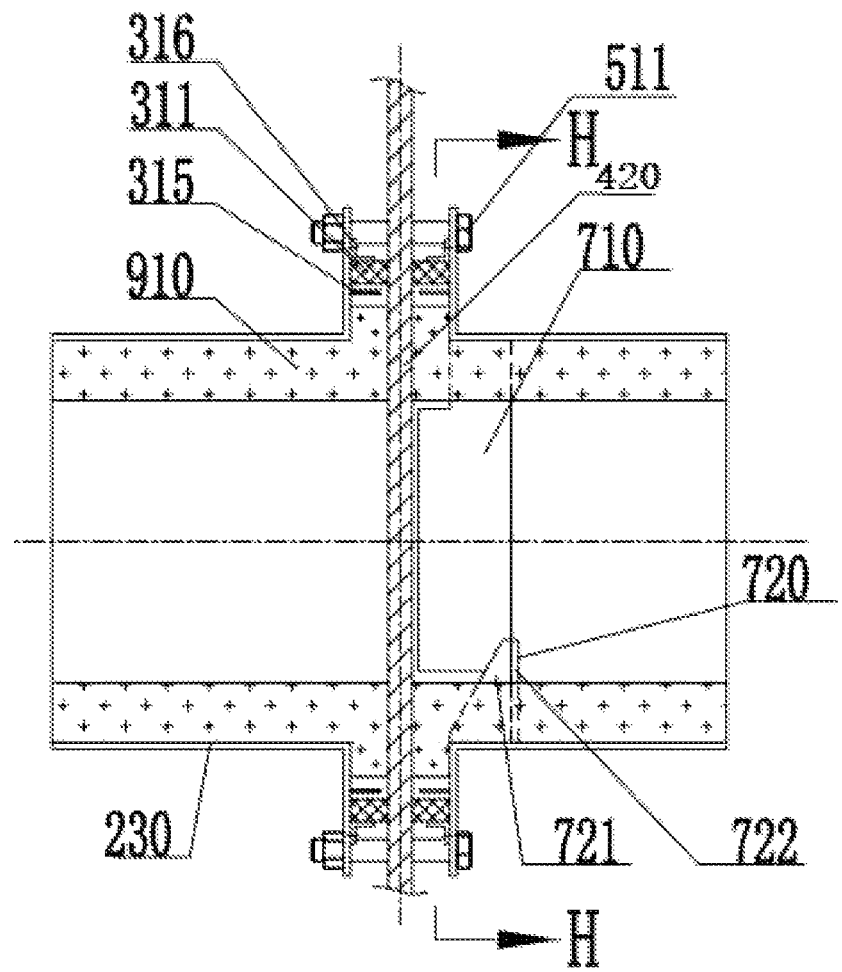
Figure 21:
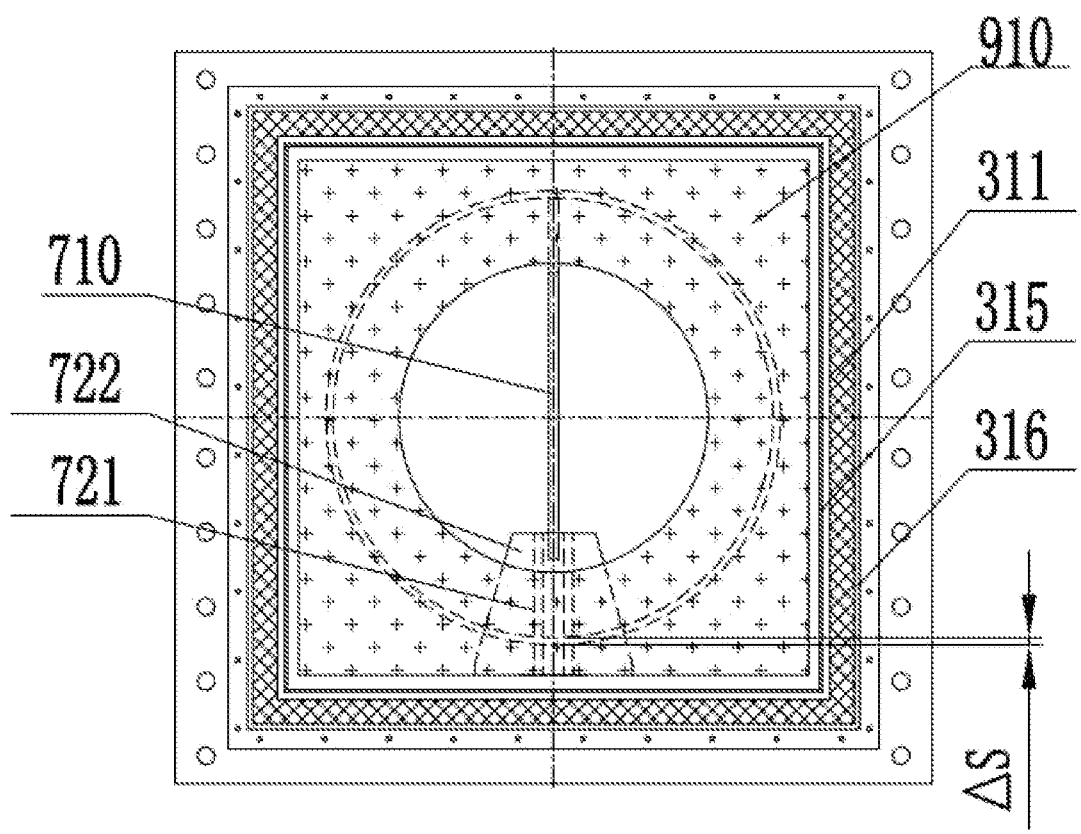

Usually, in order to evenly stress the sealing ring, and in consideration of the convenience of replacing the sealing ring or adjusting its pressing force, the sealing rings a311, 312 are set to be in a shape of a square or a rectangle, as shown in FIGS. 18, 20, 21, and the sealing rings a311, 312 are applicable to circular pipes, square pipes and pipes of other shapes.

In order to reduce the friction when the valve plate 420 enters and exits and improve the sealing performance, the sealing rings a311, 312 are usually made of packing, polytetrafluoroethylene plate, or a composite plate that connects polytetrafluoroethylene plate and rubber plate; the packing includes graphite packing, ceramic packing, etc.; in specific occasions, graphite packing containing carbon fiber, graphite packing with dynamic compensation function, etc. can be used.

Moreover, in order to improve the sealing performance and prolong the service life and solve the leakage problem of the sealing ring joint part, the sealing rings a311, 312 can be used with two or more sealing rings fit and clamped together. And in order to compensate for the wear of the sealing ring at any time, a spring (not illustrated) is installed between the fastening structure on the valve body for pressing and sealing, including the screw nut and top screw, etc., and the valve body. When two sealing rings are used, the outer diameter of one sealing ring is almost close to or equal to the inner diameter of the other sealing ring.

Embodiment 6

In consideration of cost saving, the thickness of the valve plate 420 is appropriately reduced, but meanwhile, the stiffness and strength of the valve plate 420 must be ensured so that it is capable of withstanding medium pressure. Accordingly, on the basis of the above-described embodiments, the valve can be added with a structure of ribs a710.

As shown in FIG. 1, FIG. 4, FIG. 7, FIG. 20, FIG. 21 and FIG. 23, ribs a710 are arranged downstream of the valve plate 420 and close to the position of the valve plate 420 in the pipe nipple 230, the rib a710 is usually in the shape of a long strip, and a plurality of the ribs a710 are arranged perpendicular to the surface of the valve plate 420 and parallel to each other. In the case where there is no expansion difference, both ends of the rib a710 are fixed on the inner wall of the pipe nipple 230.

When used on a pipeline having a thermal insulation layer therein or having both a thermal insulation and wear-resistant lining and a thermal insulation layer, as shown in FIGS. 20, 21, the thermal insulation layer or thermal insulation and wear-resistant lining is also set accordingly in the valve body 200 and the pipe nipple 230. In this case, to overcome or avoid the clash problem caused by the large expansion difference between the ribs a710 and the valve body 200 and the pipe nipple 230, each of the ribs a710 is configured to have a fixed end and a non-fixed end, that is, one end of the rib a710 is fixed in the pipe nipple 230, the other end is not in contact with the inner wall of the pipe nipple 230 and there is a distance Δs, and Δs is not less than the expansion difference between the ribs a710 and the pipe nipple 230.

Further, in order to ensure the stiffness of the rib a710 in this case, corresponding to the position of the non-fixed end of the rib a710, a limiting structure a is provided on the inner wall of the pipe nipple 230 adjacent to the non-fixed end, and the limiting structure a adopts a structure of a limiting lug 720, which includes two limiting plates 721 connected by a bottom plate 722. In terms of medium flow direction, the bottom plate 722 is fixed in the pipe nipple 230 and located near the downstream of the rib a710, and the two limiting plates 721 are located on both sides of the non-fixed end of the rib a710, that is, the two limiting plates 721 sandwiches the non-fixed end of the rib a710, and the two limiting plates 721 are generally parallel to the rib a710.

The arrangement of the ribs a710 is intended to serve as a strengthening structure for reducing the thickness of the valve plate to reduce costs while improving and ensuring the ability of the valve plate to withstand medium pressure.

Embodiment 7

On the basis of the above-described embodiments, the difference between the gate valve and the above-described embodiments is as follows.

Figure 22:
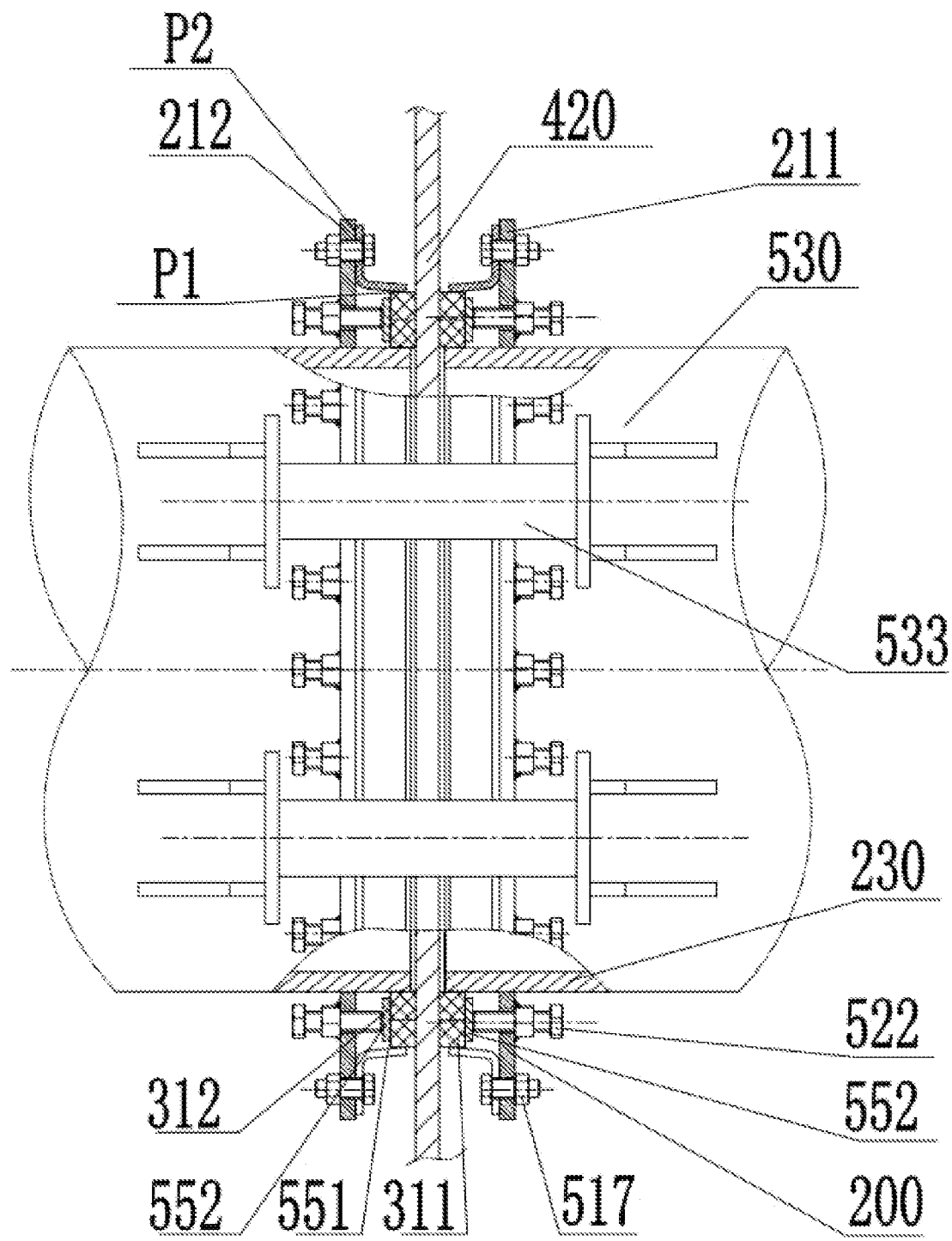
FIG. 22 is a schematic diagram of a structure according to embodiment 7 of the present invention.

For the valve, as shown in FIG. 22, the installation and positioning of the sealing rings a311, 312 on the valve body 200 are accomplished through a positioning structure 551.

The valve is provided with two pipe nipples 230, the two pipe nipples 230 are respectively fixedly connected in the medium access holes of the plates 211, 212 of the valve body and inserted into the plates 211, 212 of the valve body, and the two pipe nipples 230 have a caliber corresponding to the caliber of the on-site pipeline.

The radial inner edges of the sealing rings a311, 312 are attached to the outer wall of the pipe nipple 230; and at this time, the pipe nipple 230 also has a limiting effect on the sealing rings a311, 312.

The positioning structure adopts the structure of the positioning angle steel 551, and the positioning angle steel 551 has a positioning surface P1 and a fixing surface P2, and the angle between the two surfaces is a right angle or an obtuse angle. The positioning surface P1 abuts against the radially outer edges of the sealing rings a311, 312 so as to position the sealing rings a311, 312 in the radial direction in close contact with the pipe nipple 230, and the fixing surface P2 is attached to the inner surfaces of the plates 211, 212 of the valve body corresponding to the sealing rings a311, 312 and is connected to the plates 211, 212 of the valve body through a fastener 517, the fastener 517 is usually a screw nut, and the positioning angle steel 551 is not in contact with the valve plate 420.

Screw holes are provided at positions corresponding to the sealing rings a311, 312 on the plates 211, 212 of the valve body, and a backing plate 552 is provided between the sealing rings a311, 312 and the corresponding plates 211, 212 of the valve body. When the valve plate 420 is closed, the top screw b522 is vertically screwed into the valve body from the outer surfaces of the plates 211, 212 of the valve body and the top screw b522 is pushed to press the sealing rings a311, 312 against the valve plate 420 tightly to achieve sealing.

Several structures and forms of fastening listed in embodiment 1 can be used to press the plates 211, 212 of the valve body and their corresponding sealing rings a311, 312 and seal them after the valve plate is inserted, which will not be repeated here.

When the through-type connector a of the valve body external connection structure 530 adopts a screw nut structure 532, in some cases, in order to simplify the structure, structures such as the above-mentioned top screw b522, the backing plate 552 may not be used, and the adjustment of the clamping effect of the valve can be realized using merely the valve body external connection structure 530. At this time, the sealing rings a311, 312 are directly attached to the plates 211, 212 of the valve body and the valve plate 420 respectively.

On the basis of the various valves disclosed in the above-described embodiments, in order to obtain further technical effects, the present invention can also adopt the following technical solutions or technical features.

Figure 16:
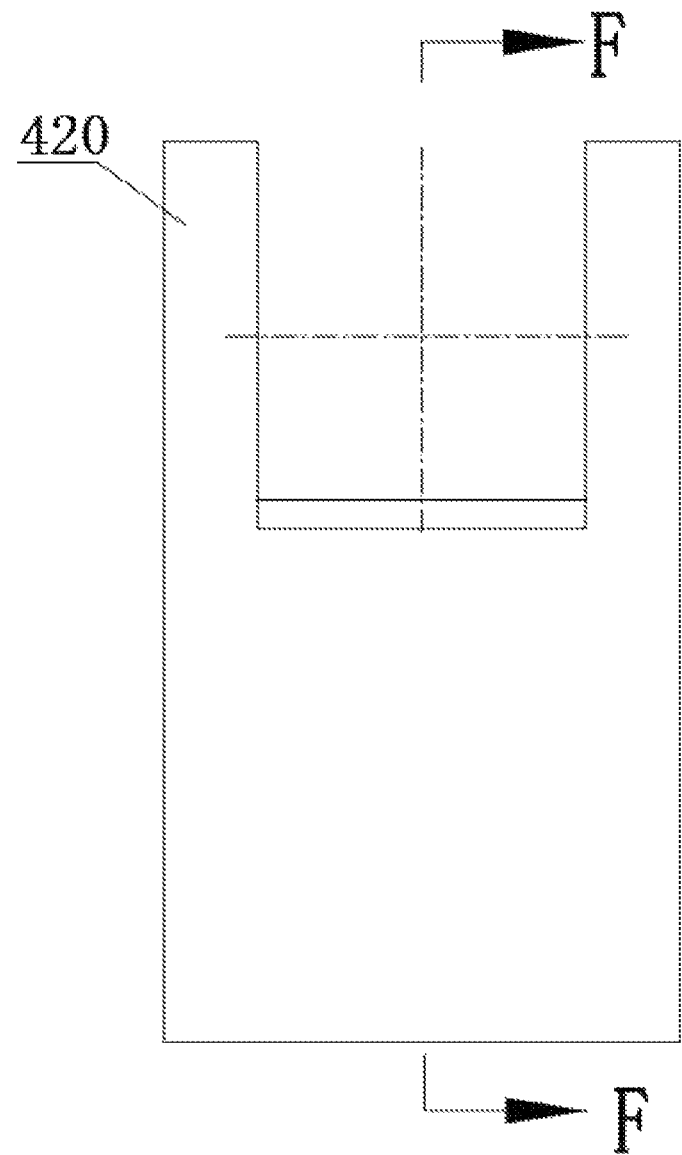
Figure 17:
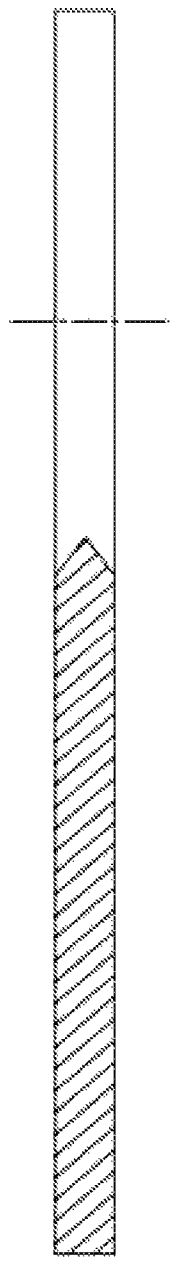

In order to prevent or reduce damage to the sealing material or sealing ring at the end T1 of the valve body and ensure the sealing effect, preferably, the position of the end t1 of the valve plate 420 is high in the middle and low on both sides in the thickness direction and is in the shape of a sharp knife or cone, as shown in FIGS. 16, 17.

In order to eliminate the influence of the surface scaling of the valve plate 420 on valve closure and sealing performance, preferably, a scraper is arranged on the inner side of the two plates 211, 212 of the valve body corresponding to the end position where the valve plate 420 enters and exits the valve body 200; and when the valve plate 420 enters and exits the valve body, the scraper is in contact with the surface of the valve plate 420 (not illustrated).

In some occasions, after the valve is closed, condensation, scaling or crystallization will inevitably occur on the cold and hot walls of the valve plate 420. In order to avoid this phenomenon, an electric heater 920 is fixed in the pipe nipple 230 to extend into the valve body 200 to heat the valve body 200. Further, in order to prevent the dust on the outer surface of the electric heater 920 from affecting its heating performance, in terms of the flow direction of the medium, a shield 921 is provided inside the pipe nipple 230 corresponding to a position adjacent to the upstream of the electric heater 920, as shown in FIG. 18. The use of electric heating can also avoid the formation of a large amount of water in the pipeline caused by the heat sealing air and a series of hazards caused thereby.

Figure 19:
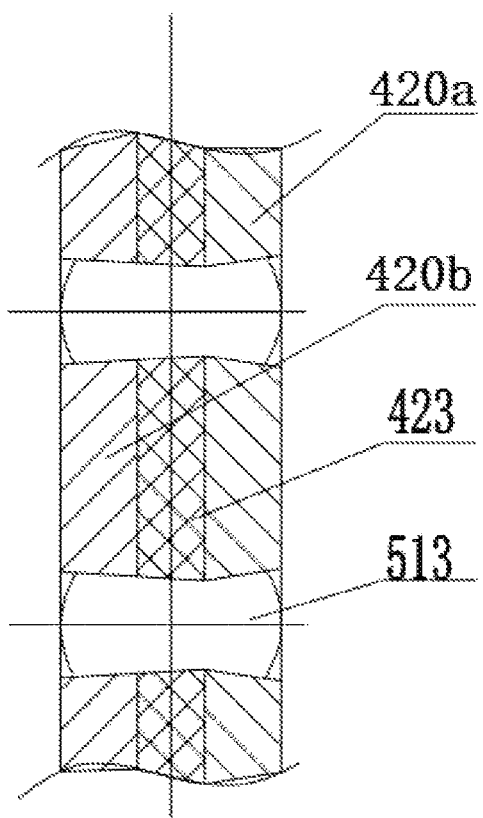
FIG. 19 is a schematic diagram of a valve plate composite structure according to the present invention.

Or, in order to reduce or avoid the series of problems caused by condensation and scaling on the cold and hot walls of the valve plate and reduce energy consumption caused by corresponding measures, the valve plate 420 is a composite valve plate with a thermal insulation interlayer, that is, the valve plate 420 is a composite structure, including two inner and outer plates 420a, 420b, with a thermal insulation interlayer 423 interposed therebetween, and the composite structure is connected in a manner of through fastening using a fastener 513, as shown in FIG. 19.

The above description is only a preferred embodiment of the present invention, but the protection scope of the present invention is not limited to this. Any equivalent replacements or changes made by a person skilled in the art within the technical scope disclosed by the present invention according to the technical solution of the present invention and the inventive concept thereof should be within the protection scope of the present invention.

What is claimed is:

1. A valve comprising:
   a valve body;
   a valve plate; and
   an actuation mechanism, wherein
   the valve body includes two plates which are parallel to each other and symmetrical and on which medium access holes are correspondingly opened,
   first sealing rings are symmetrically provided on inner surfaces of the two plates of the valve body, and the medium access holes on the two plates of the valve body are completely located within circumferentially closed holes of the first sealing rings, the valve plate is tightly sandwiched between the first sealing rings when the valve is closed,
   a fastening structure is installed on the two plates of the valve body and clamps the two plates of the valve body and/or the first sealing rings around radial peripheries of the first sealing rings, and at least a part of the fastening structure can adjust its clamping degree in a direction perpendicular to a surface of the valve body, the valve plate has two strip-shaped structures extending from both sides of a first end in a direction opposite to an opening direction of the valve plate, a thickness of the strip-shaped structures is a thickness of the valve plate, and outer edges of the strip-shaped structures are on extension lines of outer edges of the valve plate;

in a fully open state of the valve, a position of the first end of the valve plate corresponds to positions of inner edges of the first sealing rings here, a length of the strip-shaped structures is such that ends of the strip-shaped structures in the direction opposite to the opening direction of the valve plate do not fall within the valve body, and meanwhile, a width of the strip-shaped structures makes the strip-shaped structures completely press the first sealing rings at corresponding positions;

the first sealing rings respectively arranged on the two plates of the valve body are connected as a whole at a first end of the valve body where the strip-shaped structures enter and exit the valve body, and tiled to an edge of the first end of the valve body, or a first sealing material is laid in a cavity of the valve body between the edge of the first end of the valve body and the first sealing rings; and the first sealing rings or the first sealing material corresponding to the position of the first end of the valve body is provided with a first inlet and outlet of the strip-shaped structures.

2. The valve according to claim 1, wherein
the fastening structure includes a screw connection structure and/or a valve body external connection structure;
the screw connection structure includes a through-type screw nut structure, or also includes a first top screw;
the through-type screw nut structure is perpendicular to surfaces of the two plates of the valve body and penetrates the two plates to be evenly installed on the outer peripheries of the first sealing rings except for a position where the valve plate enters and exits a port of the valve body; the first top screw is evenly and symmetrically arranged on first channel steels, the first channel steels are buckled in pairs on the outer surfaces of the two plates of the valve body corresponding to the port where the valve plate enters and exits the valve body, and the first top screw presses a corresponding plate of the valve body inwardly from an outer side of a bottom plate of the first channel steel; both ends of the first channel steel(s) a protrude out of the valve body, and through-type screw nuts are installed at both ends of each pair of the first channel steels;
the valve body external connection structure includes lugs and a through-type connector;
the lugs are fixedly connected to pipe outer walls of two pipe nipples on both sides of the valve body and arranged symmetrically with respect to the two plates of the valve body, and the two pipe nipples are respectively fixedly connected in the medium access holes of the two plates of the valve body and have a caliber corresponding to a caliber of an on-site pipe; two or more of the lugs on each of the pipe nipples are evenly arranged around pipe walls of the pipe nipples, bottom plates of the lugs exceed side edges of the valve body, and the through-type connector connects and clamps the two lugs arranged symmetrically on both sides of the valve body in a direction parallel to an axis of the pipe nipples;
the through-type connector is a screw nut structure or a section steel or a steel pipe;
the screw nut structure includes a screw that penetrates the two symmetrical bottom plates of the lugs and nuts that are respectively tightened inward from outer sides of the bottom plates of the lugs, or also includes nuts located inside the bottom plates of the lugs; and the section steel or the steel pipe penetrates the two symmetrical bottom plates of the lugs to form a fixed connection.

3. The valve according to claim 1, further comprising:
a pipe nipple; and
a positioning structure, wherein two pipe nipples are respectively fixedly connected in the medium access holes of the two plates of the valve body and inserted into the plates of the valve body; the pipe nipples have a caliber corresponding to the caliber of the on-site pipeline;
radial inner edges of the first sealing rings are attached to the outer walls of the pipe nipples;
the positioning structure is located on the outer sides of the first sealing rings in a radial direction of the first sealing rings and fixed on the inner surfaces of the plates of the valve body and has no contact with the valve plate; the positioning structure has a positioning surface, and the positioning surface abuts against the radial outer edges of the first sealing rings; or the positioning structure also has a fixing surface which is connected to the positioning surface at a right angle or an obtuse angle and lies on the inner surfaces of the plates of the valve body corresponding to the first sealing rings and is connected to the plates of the valve body;
the fastening structure includes a screw connection structure and/or a valve body external connection structure;
the screw connection structure includes second top screws, or also includes a through-type screw nut structure;
the second top screws are evenly arranged corresponding to the first sealing rings, are screwed into the valve body vertically from the outer surfaces of the plates of the valve body, and push a backing plate to tighten the first sealing rings and the valve plate, and the backing plate is arranged between the inner surfaces of the plates of the valve body and the first sealing rings corresponding to the first sealing rings;
the through-type screw nut structure is evenly and symmetrically installed outside the radial outer edges of the first sealing rings, connecting the plates of the valve body and the fixing surface of the positioning structure;
the valve body external connection structure includes the lugs and the through-type connector;
the lugs are fixedly connected to the pipe outer walls of the two pipe nipples symmetrically, and two or more of the lugs on each of the pipe nipples are evenly arranged around the pipe walls of the pipe nipples, the bottom plates of the lugs exceed side edges of the valve body, and the through-type connector connects and clamps the two lugs arranged symmetrically on both sides of the valve body in a direction parallel to the axis of the pipe nipple;
the through-type connector is a screw nut structure or a section steel or a steel pipe;
the screw nut structure includes a screw that penetrates the two symmetrical bottom plates of the lugs and nuts that are respectively tightened inward from the outer sides of the bottom plates of the lugs, or also includes nuts located on the inner sides of the bottom plates of the lugs; and the section steel or the steel pipe penetrates the two symmetrical bottom plates of the lugs to form a fixed connection.

4. The valve according to claim 2, wherein
   a rib is arranged downstream of the valve plate in the pipe nipple, and the rib is perpendicular to a surface of the valve plate with at least one end fixed to an inner wall of the pipe nipple.

5. The valve according to claim 4, wherein the rib has a non-fixed end which is not in contact with the inner wall of the pipe nipple and there is a distance Δs between the non-fixed end and the inner wall of the pipe nipple, and the Δs is not less than an expansion difference between the rib and the pipe nipple; and
   a first limiting structure is provided on the inner wall of the pipe nipple adjacent to the non-fixed end corresponding to a position of the non-fixed end of the rib, and the first limiting structure restricts a displacement of the non-fixed end of the rib from one or both sides of the non-fixed end.

6. The valve according to claim 1, wherein a second limiting structure is provided adjacent to the first sealing rings on the inner surfaces of the two plates of the valve body corresponding to the first sealing rings to limit or prevent a displacement of the first sealing rings relative to the plates of the valve body; the second limiting structure has no contact with the valve plate.

7. The valve according to claim 1, wherein the sealings rings are in a square or rectangular shape, and are made of a packing, a polytetrafluoroethylene plate, or a composite plate that connects the polytetrafluoroethylene plate and a rubber plate.

8. The valve according to claim 1, wherein the first sealing material or the first sealing rings located at the first end of the valve body protrude out of the first end of the valve body and a third limiting structure is provided below the first sealing material or the first sealing rings, and the third limiting structure is respectively fixed on the inner walls of the two plates of the valve body;
   a second channel steel and a fastening structure on the second channel steel are provided corresponding to the position of the first end of the valve body, and the second channel steel is buckled on the first end of the valve body and two symmetrical elevations of the second channel steel are respectively located on the outer sides of the two plates of the valve body and parallel to the two plates of the valve body; and
   second inlet and outlet of the strip-shaped structures are opened on a bottom plate of the second channel steel.

9. The valve according to claim 8, wherein pulling lugs are provided on the outer surfaces of the two plates of the valve body, and the pulling lugs are parallel and close to the bottom plate of the second channel steel, covered in a groove of the second channel steel and not in contact with the second channel steel;
   the fastening structure on the second channel steel includes fasteners and top screws which are installed symmetrically;
   the bottom plate of the second channel steel and the corresponding pulling lugs under the bottom plate of the second channel steel are vertically connected and symmetrically clamped using the fasteners, which are installed evenly in pairs, symmetrically along a center line of the second inlet and outlet; and meanwhile, the top screws penetrate the elevations of the second channel steel in the vertical directions of the two symmetrical elevations of the second channel steel and press against the outer surfaces of the two plates of the valve body respectively in a uniform and symmetrical manner.

10. The valve according to claim 9, wherein a size of the second inlet and outlet is larger than a corresponding end size of the strip-shaped structures;
    stuffing boxes and/or stuffing cases are respectively arranged at positions corresponding to the second inlet and outlet;
    circumferences of the stuffing boxes are fixed on side walls of the second inlet and outlet;
    the stuffing cases are vertically arranged on the surface of the outer side of the bottom plate of the second channel steel, including a casing pipe, a second sealing material, a flange gland and a corresponding fastener;
    the casing pipe is sleeved on the strip-shaped structures and a first flange is provided at least at one end far away from the second inlet and outlet; the second sealing material is filled in the casing pipe or wound on the strip-shaped structures and is closely attached to the first sealing material or the first sealing rings protruding out of the first end of the valve body; and the flange gland is screwed to the first flange at one end of the casing pipe away from the second channel steel through a corresponding fastener.

11. The valve according to claim 10, wherein the casing pipe is provided with a second flange at one end near the second channel steel, a second sealing ring is provided between the second flange and the bottom plate of the second channel steel, the second flange is screwed to the second channel steel, corresponding connecting holes on the second flange are long holes, and long sides of the long holes are parallel to the bottom plate of the second channel steel and perpendicular to the axis of the valve body.

12. The valve according to claim 11, wherein a movable flange and a friction reduction structure are further provided between the second sealing ring and the second channel steel; the friction reduction structure is disposed on the outer surface of the bottom plate of the second channel steel and is sleeved around an outer periphery of the second sealing material; the movable flange is located between the friction reduction structure and the sealing ring; and the second flange, the movable flange and the second channel steel are screwed sequentially.

13. The valve according to claim 8, further comprising:
    a sealing detection structure, wherein the sealing detection structure includes a square pipe or a square steel, a detection hole and a hole cover of the detection hole;
    the square pipe or the square steel is sandwiched between the inner side of the bottom plate of the second channel steel and the first sealing material or the first sealing rings protruding out of the first end of the valve body, and is closely attached to the two symmetrical elevations of the second channel steel in a lateral direction;
    strip-shaped access holes are opened on the square pipe or the square steel corresponding to the strip-shaped structures and the second sealing material surrounded or wrapped around the strip-shaped structures;
    side detection holes are opened corresponding to the strip-shaped access holes at both ends of the square pipe or the square steel respectively; and
    at least one detection hole of the first end of the valve body is opened on the square pipe or the square steel corresponding to a position between the strip-shaped access holes.

* * * * *